(12) United States Patent
Cheng et al.

(10) Patent No.: US 10,878,698 B2
(45) Date of Patent: Dec. 29, 2020

(54) INTERACTIVE VEHICULAR COMMUNICATION

(71) Applicant: QUALCOMM Incorporated, San Diego, CA (US)

(72) Inventors: Hong Cheng, Bridgewater, NJ (US); Shailesh Patil, San Diego, CA (US); Dan Vassilovski, Del Mar, CA (US); Richard Hovey, Branchburg, NJ (US); Arjun Bharadwaj, Cupertino, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/711,063

(22) Filed: Dec. 11, 2019

(65) Prior Publication Data

US 2020/0193829 A1 Jun. 18, 2020

Related U.S. Application Data

(60) Provisional application No. 62/779,413, filed on Dec. 13, 2018.

(51) Int. Cl.
*G08G 1/16* (2006.01)
*H04W 4/46* (2018.01)
(Continued)

(52) U.S. Cl.
CPC ............ *G08G 1/162* (2013.01); *G08G 1/166* (2013.01); *G08G 1/168* (2013.01); *H04W 4/44* (2018.02); *H04W 4/46* (2018.02); *H04W 4/90* (2018.02)

(58) Field of Classification Search
CPC ........ G08G 1/162; G08G 1/168; G08G 1/166; G08G 1/202; H04W 4/46; H04W 4/90;
(Continued)

(56) References Cited

U.S. PATENT DOCUMENTS

2017/0038777 A1* 2/2017 Harvey ............... G05D 1/0022
2017/0084174 A1 3/2017 Suzuki
(Continued)

FOREIGN PATENT DOCUMENTS

| JP | 2014240244 A | * | 12/2014 |
|---|---|---|---|
| WO | 2017167580 A1 | | 10/2017 |
| WO | 2018128946 A1 | | 7/2018 |

OTHER PUBLICATIONS

International Search Report and Written Opinion—PCT/US2019/066002—ISA/EPO—dated Mar. 13, 2020.

*Primary Examiner* — Rodney A Butler
(74) *Attorney, Agent, or Firm* — Arent Fox LLP

(57) ABSTRACT

Methods, apparatuses, and computer-readable mediums for wireless communication are disclosed by the present disclosure. In an aspect, a first user equipment (UE) receives data from one or more sensors associated with the first UE; identifies intent-related information related to an intent of the first UE, based on the data, wherein the intent-related information indicates exiting a parking spot, opening a door, providing OK to pass via blind spot detection, passing a vulnerable road user (VRU), passing a toll structure, entering a high occupancy vehicle (HOV) lane, or making an emergency call (eCall); and communicates the intent-related information to a second UE. In another aspect, a first UE receives a message from a second UE including intent-related information related to an intent of the second UE based on data from one or more sensors associated with the (Continued)

second UE; and communicates with the second UE regarding the intent-related information.

21 Claims, 12 Drawing Sheets

(51) Int. Cl.
*H04W 4/44* (2018.01)
*H04W 4/90* (2018.01)

(58) Field of Classification Search
CPC . H04W 4/44; G01C 21/3691; G01C 21/3697; G01C 21/3679; G06Q 50/30; G06Q 10/04
See application file for complete search history.

(56) References Cited

U.S. PATENT DOCUMENTS

| | | | |
|---|---|---|---|
| 2017/0320490 A1* | 11/2017 | Yuan | B60W 30/06 |
| 2018/0118198 A1* | 5/2018 | Yuan | B60W 30/06 |
| 2018/0352027 A1* | 12/2018 | Sharma | G08G 1/096816 |
| 2019/0361451 A1* | 11/2019 | Wilson | G06Q 50/30 |

* cited by examiner

INTERACTIVE VEHICULAR COMMUNICATION

CROSS-REFERENCE TO RELATED APPLICATION(S)

This application claims the benefit of U.S. Provisional Application Ser. No. 62/779,413, entitled "INTERACTIVE VEHICULAR COMMUNICATION" and filed on Dec. 13, 2018, which is expressly incorporated by reference herein in its entirety.

BACKGROUND

Technical Field

The present disclosure relates generally to communication systems, and more particularly, to a vehicular communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology, for example, relating to vehicular communication systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

In an aspect, a method of wireless communication at a first user equipment (UE) includes receiving data from one or more sensors associated with the first UE; identifying intent-related information related to an intent of the first UE, based on the data, wherein the intent-related information indicates exiting a parking spot, opening a door, providing OK to pass via blind spot detection, passing a vulnerable road user (VRU), passing a toll structure, entering a high occupancy vehicle (HOV) lane, or making an emergency call (eCall); and communicating the intent-related information to a second UE.

In another aspect, a non-transitory computer-readable medium of a first UE stores instructions that when executed by a processor of the first UE cause the processor to receive data from one or more sensors associated with the first UE; identify intent-related information related to an intent of the first UE, based on the data, wherein the intent-related information indicates exiting a parking spot, opening a door, providing OK to pass via blind spot detection, passing a VRU, passing a toll structure, entering an HOV lane, or making an eCall; and communicate the intent-related information to a second UE.

In a further aspect, a first UE for wireless communication includes a memory storing instructions; and a processor in communication with the memory, wherein the processor is configured to execute the instructions to receive data from one or more sensors associated with the first UE; identify intent-related information related to an intent of the first UE, based on the data, wherein the intent-related information indicates exiting a parking spot, opening a door, providing OK to pass via blind spot detection, passing a VRU, passing a toll structure, entering an HOV lane, or making an eCall; and communicate the intent-related information to a second UE.

In yet another aspect, a method of wireless communication at a first UE includes receiving a message from a second UE including intent-related information related to an intent of the second UE based on data from one or more sensors associated with the second UE, wherein the intent-related information indicates exiting a parking spot, opening a door, providing OK to pass via blind spot detection, passing a VRU, passing a toll structure, entering an HOV lane, or making an eCall; and communicating with the second UE regarding the intent-related information.

In another aspect, a non-transitory computer-readable medium of a first UE stores instructions that when executed by a processor of the first UE cause the processor to receive a message from a second UE including intent-related information related to an intent of the second UE based on data from one or more sensors associated with the second UE, wherein the intent-related information indicates exiting a parking spot, opening a door, providing OK to pass via blind spot detection, passing a VRU, passing a toll structure, entering an HOV lane, or making an eCall; and communicate with the second UE regarding the intent-related information.

In a further aspect, a first UE for wireless communication includes a memory storing instructions; and a processor in communication with the memory, wherein the processor is configured to execute the instructions to receive a message from a second UE including intent-related information related to an intent of the second UE based on data from one or more sensors associated with the second UE, wherein the intent-related information indicates exiting a parking spot, opening a door, providing OK to pass via blind spot detection, passing a VRU, passing a toll structure, entering an HOV lane, or making an eCall; and communicate with the second UE regarding the intent-related information.

Although some aspects may relate to one-to-one communication (e.g., a first UE to a second UE), some other aspects may include a UE receiving data from multiple UEs, or a UE sending data to multiple UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
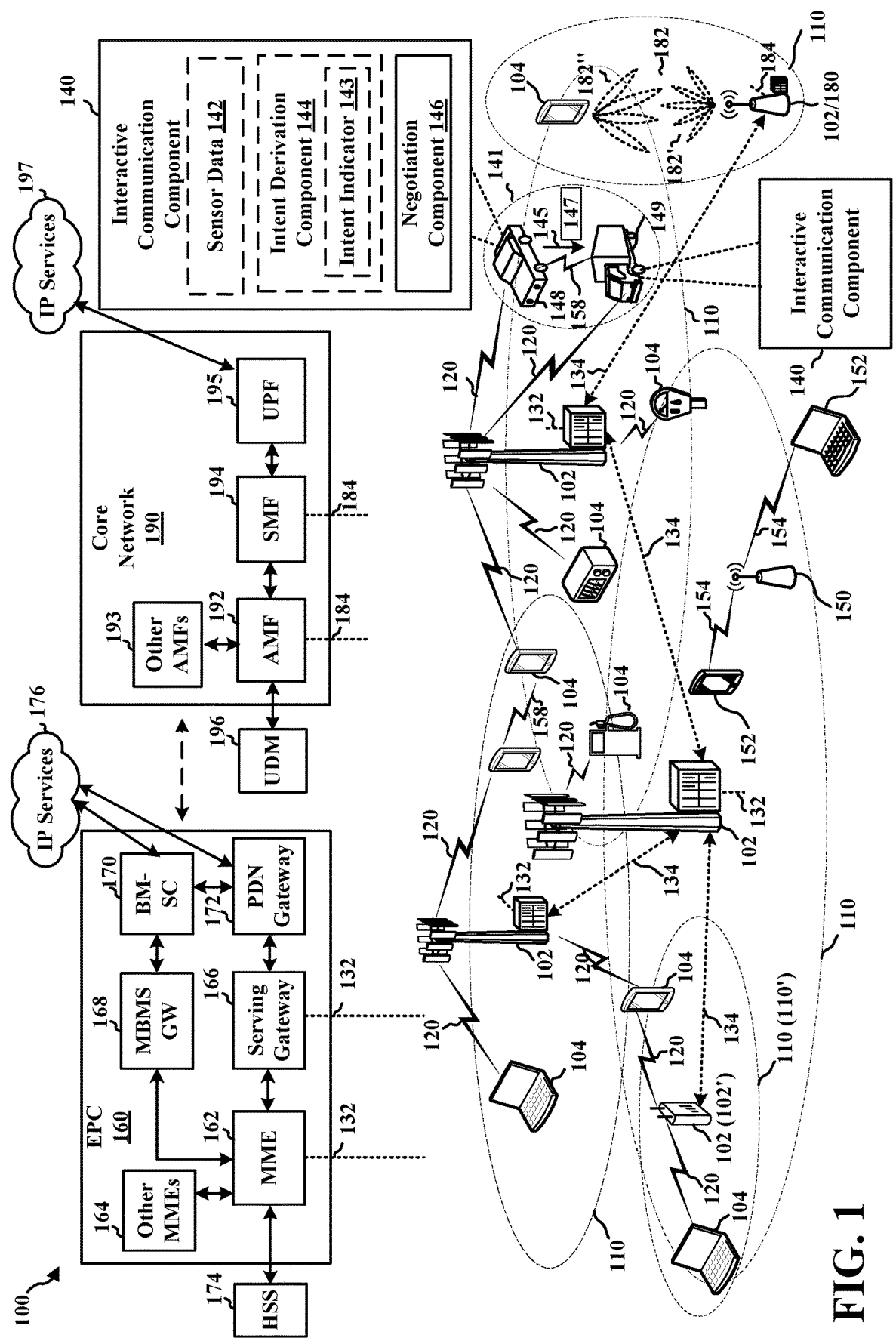
FIG. 1 is a schematic diagram of an example wireless communications system and an access network, according to some aspects.

The present aspects provide interactive application layer user equipment (UE) communication in a wireless communication system (e.g., including vehicular systems such as vehicle-to-vehicle (V2V) and/or vehicle-to-everything (V2X) networks and/or enhanced vehicle-to-everything (eV2X) networks). In accordance with the described methods and features thereof, a UE such as a vehicle may receive information from various associated sensors, and may interact with other UEs to share such sensor information or information derived therefrom to communicate an intent of the UE and/or vehicle. For example, the sensors may be configured to detect an object, status, or event related to the UE or related to a surrounding of the UE (e.g., an object in a vicinity of the UE, an event/status related to an object in a vicinity of the UE, etc.). Also, for example, the term intent means an impending maneuver or action. Further, for example, the information may be shared via broadcast, multicast, or unicast V2X communication. The shared information indicating the intent of the UE and/or vehicle may be used by the UEs to negotiate a vehicular maneuver, manage road access/toll, report an emergency call (eCall), etc. Accordingly, the present aspects may provide improved autonomous driving (e.g., in self-driving vehicles operating with reduced or zero human input) and/or improved driving experience (e.g., improved non-autonomous human driving).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system and an access network 100 includes UEs 104 that may be configured for interactive communication with other UEs 104 in response to an identified intent based on sensor data. For example, in an aspect, UEs 104 may include UEs 148 and 149, each including an interactive communication component 140 configured for enabling interactive communication between UEs 148 and 149. For example, the interactive communication component 140 in UE 148 may be configured to share intent-related information 145, including sensor data 142 and/or a corresponding intent indicator 143 that is based on the sensor data 142, with the UE 149 via interactive V2X communications. Alternatively and/or additionally, infrastructure components such as a road side unit (RSU) 147 may also include sensors and at least the interactive communication component 140 configured for enabling interactive communication with UEs (such as 148 and 149) and/or with other infrastructure components. For example, the infrastructure components may be configured to share the intent-related information 145, including the sensor data 142 and/or the corresponding intent indicator 143 that is based on the sensor data 142 from one UE, multiple UEs, from its own sensors, from other infrastructure components, or from combinations of the aforementioned.

The V2X communications may include, for example, device-to-device (D2D) communication links 158 in a D2D communications system 141. Alternatively and/or additionally, the V2X communications may be sent via the network, or may be relayed, for example, by the RSU 147. The sensor data 142 may be indicative of an intent of the vehicle related to the UE 148, such as an impending maneuver or action. The intent indicator 143 may be a code or value or any other mechanism that identifies at least one of a plurality of impending maneuvers or actions. The UEs 148 and 149 in the D2D communications system 141 may include various devices related to vehicles and transportation. For example, the UEs 148 and 149 may include vehicles, devices within vehicles, vulnerable road users (VRUs) such as pedestrians, bicycles, segways, etc., or transportation infrastructure such as roadside devices (e.g., an RSU), tolling stations, fuel supplies, or any other device that may communicate with a vehicle.

In particular, for example, the sensor data 142 may be generated by various sensors associated with the UE 148, such as a camera, radar, or light detection and ranging (LIDAR) configured to monitor an object inside or outside the vehicle, a proximity sensor configured to detect an object inside or outside the vehicle, sensors detecting driving data such as speed, trajectory, fuel level, etc., vehicle internal and status sensors such as tire-pressure sensors, engine status (e.g., overheating, oil pressure, yaw, roll, pitch, lateral acceleration), a proximity sensor configured to detect seatbelt status or seat occupancy status, sensors detecting a driver's hands on a steering wheel, an in-cabin camera, voice detection sensors, ultrasonic sensors (used for example in parking assist functions), etc.

In an aspect, the UE 148 may implement an intent derivation component 144 configured to use the sensor data 142 to derive the intent indicator 143 of the UE 148 indicating an intent of the UE 148, such as an intended maneuver or action. For instance, examples of such maneuvers or actions may include, but are not limited to, exiting a parking spot, opening a door, a driver being warned of another vehicle in a blind spot and providing OK for the other vehicle to pass, passing a VRU, passing a toll booth, entering a high occupancy vehicle (HOV) lane, etc.

In other alternatives, however, the intent derivation component 144 of the UE 148 may transmit the sensor data 142 to another device, such as but not limited to an RSU 147, and in response may receive intent-related information related to the intent of the UE 148, where the intent-related information is identified by the RSU 147 based on the data. In an aspect, for example, the intent-related information received from the RSU 147 may include the intent indicator 143, which the intent derivation component 144 can decode to identify the intent of the UE 148. In any case, the UE 148 may further include a negotiation component 146 configured to communicate the intent-related information 145, or more specifically in this example the intent indicator 143, with the UE 149 and/or to negotiate a corresponding action with the UE 149. Correspondingly, the interactive communication component 140 in the UE 149 may also include at least the negotiation component 146 configured to receive the intent-related information 145 and support the interaction/negotiation with the UE 148 regarding the intent of the UE 148.

Further details of the UEs 148 and 149, and the features of the present disclosure relating to determining the intent-related information 145 and/or negotiating subsequent actions are described below with reference to FIGS. 2-23.

Still referring to FIG. 1, the wireless communications system (also referred to as a wireless wide area network (WWAN)) further includes base stations 102, an Evolved Packet Core (EPC) 160, and/or another core network 190 (e.g., a 5G Core (5GC)). The base stations 102 may include macro cells (high power cellular base station) and/or small cells (low power cellular base station). The macro cells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with the core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or the core network 190) with each other over backhaul links 134 (e.g., X2 interface). The backhaul links 132, 134, 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cells and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

As mentioned above, certain UEs 104, such as the UE 148 and 149, may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, Zig-Bee, Wi-Fi based on the IEEE 802.11 standard, LTE, or NR. Additionally, the D2D communication link 158 may be implemented in vehicular systems, such as vehicle-to-vehicle (V2V) and/or vehicle-to-everything (V2X) networks and/or enhanced vehicle-to-everything (eV2X) networks.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

In an aspect, for example, the IP Services 176 and the IP Services 197 may be connected, for example, to allow for using the EPC in parallel for downlink MBMS transmission of the V2X messages.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Additionally, in the following discussion, the UE 104 may be associated with a vehicle, and so the term "vehicle" may inherently include the associated UE 104, and/or the described vehicle-based analysis of sensor data, determining an intent, communicating the sensor data and/or the intent, and/or negotiating and subsequent communications may be performed by the associated UE 104.

Currently, vehicle automation mechanisms are usually based on local sensors, e.g. camera, radar, LIDAR, etc. However, these mechanisms are mostly limited to Line of Sight (LOS) object detections, e.g., they cannot detect a bike blocked by another car. In addition, these mechanisms usually do not offer sufficient information regarding the environment or intent of the detected object, e.g., they cannot tell if an on-coming car is going to slow down. Also, such mechanisms normally only detect an event as it is starting, or after it has started, e.g., current mechanisms can inform if a vehicle is moving, but cannot predict if a parked car is about to move out of its parking spot. V2X offers a better way to share information among road users, including broadcast, multicast and unicast. Still, current V2X communication has limited capabilities in generating the useful information to share with other vehicles, e.g., limited to basic information on speeds, location, braking status, etc.

In contrast, the present disclosure provides predictive V2X interactions based on sensor data. In some cases, the functionality of the disclosed predictive V2X interactions may be implemented in the application layer of the protocol layer stack of a UE. For example, some aspects generate meaningful events/information for V2X communication based on sensor fusion, which includes the combining and analysis of data from various sensors in order to determine and/or predict an impending maneuver or action, e.g., an intent. In an aspect, for example, useful events about the driver's intention are created/predicted based on input from multiple in-car sensors. In some implementations, for example, the inputs from the sensors may be directly used to infer the intent. In other examples, inputs from multiple sensors when matching a preset sequence(s) of events allows for an intent to be derived. Alternatively and/or additionally, machine learning (e.g., artificial intelligence (AI)) mechanisms may be applied to the sensor data to derive certain events based on, but not limited to, identifying the vehicle driver and the habits or driving history of the individual driver user or driver users of a vehicle; or, in the event of an autonomously driven vehicle, the habits of a passenger or passengers or the vehicle driving history.

For example, in an aspect, the present disclosure may include inputting received sensor data to one or more intent scenario models that can process the data to predict the intent. For instance, each of the one or more intent scenario models may be trained with a plurality of historical sensor data known to correspond to a respective intent such that each model is trained to predict the given intent. It should be understood that other machine learning and/or AI models or mechanisms may also be utilized. Some further aspects create an interactive V2X communication scheme, such that shared information can be used for helping road behavior management. In an aspect, for example, feedback (such as with unicast communication) is used to allow cars or other road users to determine the safest behaviors or to negotiate the safest behavior.

Some alternative aspects may use communication mechanisms other than V2X to provide predictive interactions between UEs based on sensor data. For example, some alternative aspects may use a cellular wireless network to share/relay various sensor information. However, as compared to V2X and similar mechanisms such as cellular V2X (C-V2X), a non-V2X communication mechanism may have connectivity requirements and/or may incur delays or other quality of service (QoS) issues. Further, in a general mobile network, a separate entity may manage the location of two UEs to determine their relative proximity, and a message communication link may need to be established to route a message from one UE to another. That is, in some aspects, a network entity may maintain relationship information of UEs and use such information for sensor data sharing and/or for predictive interactions between the UEs based on shared data. Such management requirements may impose further requirements on system resources and delay or other QoS parameters. In contrast, a V2X (or C-V2X) communication can be established without a network connection, and can be established directly between V2X-capable devices without needing to detect presence or relative location of two V2X-capable devices. Some aspects use V2X to implement localized sharing of information between V2X-capable devices, such as cars or VRUs. Specifically, some aspects use V2X to implement localized sharing of information between V2X-capable devices via one-to-one communication such as unicast, or via one-to-many communication such as multicast or broadcast.

The present disclosure may be applicable in many different use case, for example, for:

Vehicle intent sharing such as parking spot exit or vehicle door opening
Providing OK to pass via blind spot detection confirmation
Providing VRU lateral passing distance alert
Roadway and/or HOV access toll management
eCall delegation via alert using V2X These example aspects are further described below with reference to FIGS. 2-23.

For example, in an aspect, vehicle-based sensor fusion and/or learned behavior may be used for vehicle intent sharing to indicate that a vehicle is exiting a parking spot. Currently, a vehicle is able to inform other road users of an action only after the action has started. For example, currently, a vehicle can only inform other road users that the vehicle is backing out of a parking spot after the vehicle has started to back up. Such late indication of intent may reduce the reaction time for other road users, for example, when the vehicle's sensors are unable to detect the other road users, or when the other road users are equipped with communication capabilities but not sensor capabilities, such as pedestrians or cyclists.

However, some present aspects provide earlier intent indication by using sensor fusion-based inference and V2X-based (or, e.g., C-V2X-based) negotiation. In some aspects, sensor fusion-based inference is performed by combining the input of multiple sensors available on vehicles, such that a processor on the vehicle may infer the intent to back up before the backing up action is started. For example, the inference may be performed based on the detection of a sequence of events, such as, but not limited to, A door being opened and closed, the seat occupancy sensor detecting a driver, the seatbelt being buckled, the engine ignition being turned on, and a parking assist function being released, thus indicating that the vehicle is possibly about to move.

The vehicle's cameras determining that the vehicle is in a parking spot, e.g., through the detection of signage, parking meters, other vehicles, curbs, etc.

The vehicle's cameras detecting that the vehicle is in a parking spot before the ignition was last turned off The vehicle's location service determining that the location is a parking spot.

The vehicle's navigation function has last been used for parking.

The inference may be strengthened or may have an increased confidence by using a learned behavior analysis, such as:

The vehicle has just completed a known, previously used commute path, possibly combined with camera recognition of the driver who executes the commute.

The vehicle's driver consistently conducts the same sequence of steps when exiting a parking spot, such as turning off media, engaging brakes, etc.

In an aspect, once the vehicle infers the intent to exit the parking spot, the vehicle may perform V2X-based negotiation, for example, by using V2X unicast communication, to transmit the intent to other road users, such as other vehicles, or VRUs such as pedestrians or cyclists. If one or more of the other road users determine that the vehicle's action, such as backing up, may create a safety issue (for example, another vehicle detects by a camera that a pedestrian or cyclist is about to pass behind the car that intend to exit the parking spot), the other road user may use unicast communication to the vehicle to request that the vehicle cease the corresponding maneuver to exit the parking spot. In response, the vehicle may acknowledge the request and confirm cessation of the maneuver.

Figure 2:
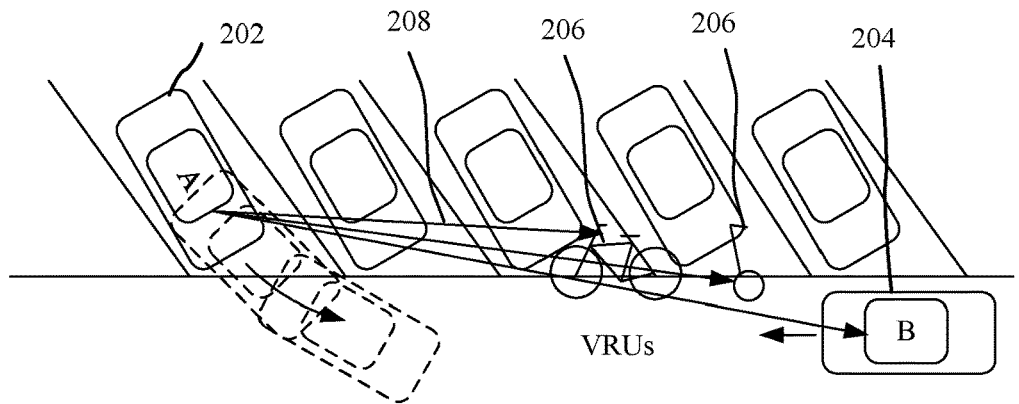
FIG. 2 is a schematic diagram of a first example system for interactive communication, according to some aspects.

Referring to FIG. 2, an example communication scenario according to the present disclosure relates to a vehicle having the predicted intent of exiting a parking spot. In this example, vehicle A 202, which may be or which may include or be associated with the UE 148 (FIG. 1), may intend to exit a vertical/angle parking spot, while vehicle B 204, which may be or which may include or be associated with the UE 149 (FIG. 1), may be approaching. In vehicle A 202, several sensor detections (individually, or as part of a sequence, or some combination of both) may be indicative of the intent to exit the parking spot, for example, a key fob proximity being detected, a door being unlocked, a door being opened, a seat sensor being active, a door being closed, a seatbelt being buckled, an ignition being turned on, a parking brake being released, etc. Alternatively and/or additionally, images from one or more external-facing cameras may be indicative of the intent to exit the parking spot, for example, when the UE 148 detects within the images are a parking meter(s), a parking signage, lane markings, a sidewalk, and/or other visual cues indicating a parking spot. Alternatively and/or additionally, a Global Navigation Satellite System (GNSS) detection of a parking spot or parking structure may be indicative of the intent to exit the parking spot. Alternatively and/or additionally, the vehicle navigation system may determine that the last action taken by the vehicle before the ignition was shut off was to find parking, and hence upon subsequent turning on of the ignition may indicate the intent to exit the parking spot. Alternatively and/or additionally, prior vehicle/driver activity may suggest that a parking spot exit is imminent, for example, based on time-of-day, vehicle location, driver recognition corresponding to a start or an end of a known commute path, etc. From some or all of the aforementioned data, vehicle A 202 may infer that vehicle A 202 is about to back up out of the parking spot.

Once the intent is determined, vehicle A 202 may inform other vehicles, such as vehicle B 204, of such an intent. For example, as shown in FIG. 2, vehicle A 202 may unicast a corresponding V2X action 208 including intent-related information, e.g., unicast an alert of parking exit to vehicle B 204 and/or other road users in the vicinity such as one or more VRUs 206 (e.g., a bicycle, scooter, pedestrian, etc.) in the vicinity of vehicle A 202. Alternatively, however, vehicle A 202 may broadcast or multicast the corresponding V2X action 208, e.g., broadcast or multicast an alert of parking exit. Subsequent to communicating the intent, vehicle A 202 may engage in a negotiation with vehicle B 204 and/or the VRUs 206 regarding the intent of vehicle A 202 to exit a parking spot and the potential effect of the intent on the safety of vehicle B 204 and/or the VRUs 206.

Although the participation of the VRUs 206 in the V2X negotiation is described above with reference to this example, such participation of VRUs 206 is not limited to this case, and V2X-capable VRUs 206 may participate in any V2X negotiation described herein with reference to various aspects, as applicable.

Figure 3:
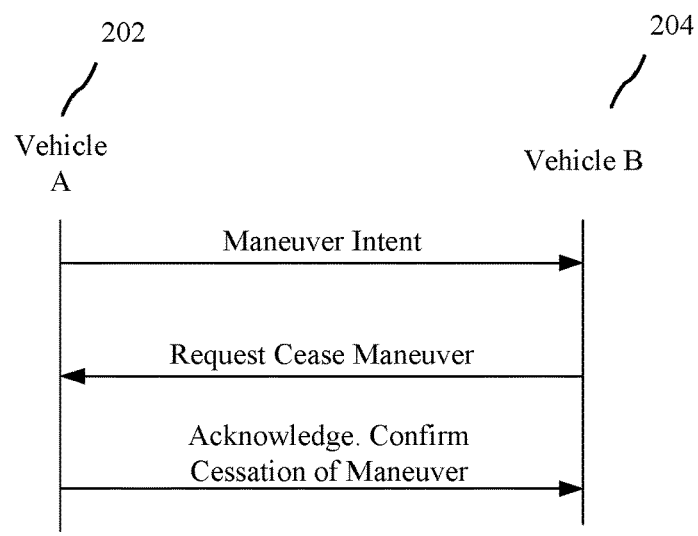
FIG. 3 is a message sequence diagram corresponding to the example system of FIG. 2, according to some aspects.

Referring to FIG. 3, an example message exchange between vehicles after the intent of vehicle A 202 is determined includes vehicle B 204 receiving a message (the V2X action 208) from vehicle A 202 indicating the maneuver intent, e.g., to exit a parking spot. In response, vehicle B 204 may determine potential safety issues if vehicle A 202 proceeds to exit the parking spot. The potential safety issues may include, for example, insufficient time for vehicle B 204 to safely stop or change path. If there are safety issues associated with the maneuver, vehicle B 204 may send a message (e.g., via unicast) to vehicle A 202 directing vehicle A 202 to cease the maneuver. In response, vehicle A 202 may send a message (e.g., via unicast) to vehicle B 204 acknowledging and confirming cessation of maneuver. The example messaging in FIG. 3 is vehicle-to-vehicle communication, however, these aspects are also applicable to communication with a VRU, such as a bicycle, scooter, pedestrian, if the VRU is capable of such messaging.

The example system in FIG. 2 includes a vertical/angle parking scenario, however, these aspects are also similarly applicable to parallel parking or any other type of parking scenario.

In some aspects, for example, sensor fusion may be performed in one of the following locations:
  locally, i.e., local sensor fusion (fully distributed)
  at the edge of network, i.e., an RSU, where the edge network entity is able to participate in V2X communication directly (partially distributed)
  by the network, i.e., network sensor fusion, where the network entity has to be relayed (centralized)
In some alternative and/or additional aspects, sensor fusion may be performed at a combination of the above locations, i.e., locally as well as at the network.

In some aspects, for example, the processing of the sensor data and the inference, derivation, and/or prediction of the intent may be performed locally at vehicle A 202. Alternatively and/or additionally, vehicle A 202 may offload at least a portion of the processing of the sensor data to the network side to perform sensor fusion to determine if a warning is needed. Alternatively and/or additionally, vehicle A 202 may offload at least a portion of the processing of the sensor data to one or more mobile edge computing devices, multi-access edge computing (MEC) devices, or to an RSU. In these aspects, the mobile edge computing devices, the MEC devices, and/or the RSU may be connected to both vehicle A 202 and vehicle B 204. In some aspects, the RSU may be a hybrid of network, edge network, and V2X-capable devices. Such offloading is not specific to this aspect, and similar offloading of the processing of the sensor data or other data may be performed in any of the other aspects described herein.

In another example aspect relating to a vehicle door opening scenario, vehicle-detected sensor fusion and/or learned behavior may be used for vehicle intent sharing to indicate that a vehicle door is about to be opened. Some present aspects provide early intent indication by using sensor fusion-based inference and V2X-based negotiation. In some aspects, sensor fusion-based inference is performed by combining the input of multiple sensors available on vehicles, such that a processor on the vehicle may infer the intent to open a door before the opening action is started. For example, the inference may be performed based on the detection of a sequence of events, such as, but not limited to,
  The vehicle is slowing or stopping at a location recognized as a parking spot by the vehicle's cameras, for example, through the detection of signage, parking meters, other parked cars, curbs, etc.
  The vehicle's navigation function was last used to locate parking, or the location is recognized as a parking spot by the vehicle's location service.
  The vehicle's parking assist function is engaged, the gear is set to park, and the media player is turned off. Some high end cars may also allow for automatically turning off the engine when the seatbelt is unbuckled, in which case the engine turning off may also be used as an indicator that the vehicle door may open.
The inference may be strengthened using a learned behavior analysis, such as:
  The vehicle has just completed a known, previously used commute path, possibly combined with camera recognition of the driver who executes the commute.
  The vehicle's driver consistently conducts the same sequence of steps when parking, such as turning off media, engaging brake, etc.

In an aspect, once the vehicle infers the intent to open a door, the vehicle may perform V2X-based negotiation, for example, by using V2X unicast communication, to transmit the intent to other road users, such as other vehicles, or VRUs such as pedestrians or cyclists. If one or more of the other road users determine that the vehicle's action to open a door may create a safety issue, the other road user may use unicast communication to the vehicle to request that the vehicle cease the action to open the door. In response, the vehicle may acknowledge the request and confirm cessation of the action.

Figure 4:
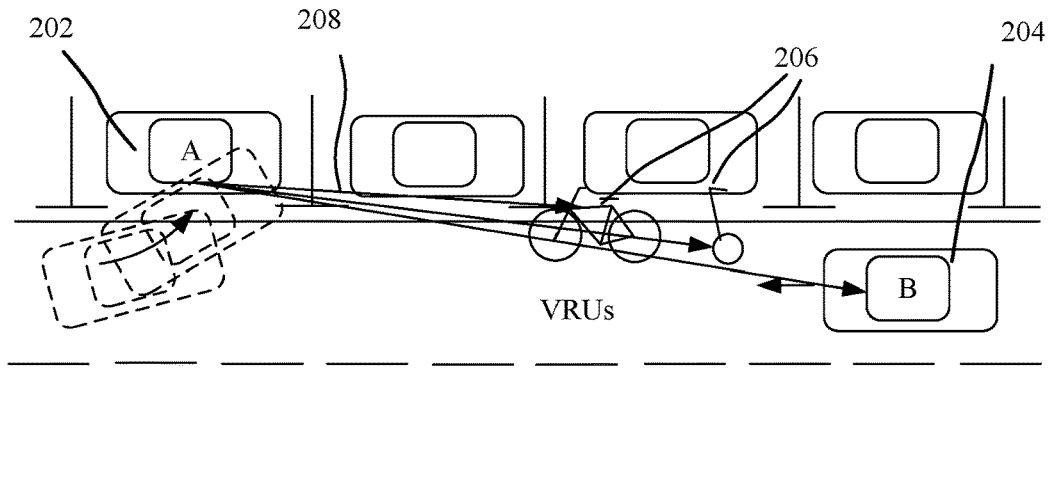
FIG. 4 is a schematic diagram of a second example system for interactive communication, according to some aspects.

Referring to FIG. 4, for example, vehicle A 202, which may be or which may include or which may be associated with the UE 148 (FIG. 1), may intend to open a door, while vehicle B 204, which may be or which may include or which may be associated with the UE 149 (FIG. 1), may be approaching. In vehicle A 202, several sensor detections may be indicative of the intent to open a door, for example, the vehicle speed reducing, an indicator being invoked, a park assist being engaged. Alternatively and/or additionally, images from one or more external-facing cameras may be indicative of the intent to open a door, for example, when detecting a parking spot such as parking meters, signage, lane markings, sidewalk, or other visual cues indicating a parking spot. Alternatively and/or additionally, a GNSS detection of a parking spot or parking structure may be indicative of the intent to open a door. Alternatively and/or additionally, events such as the engine being turned off, the gear being set to park, a seatbelt being unbuckled, the media player being turned off, and/or some user devices such as handheld devices being unpaired from the vehicle may indicate the intent to open a door. Alternatively and/or additionally, the vehicle navigation system may determine that the last action taken by the vehicle before the ignition was shut off was to find parking, and therefore a door opening is imminent. Alternatively and/or additionally, prior vehicle/driver activity may suggest that a door opening is imminent, for example, based on time-of-day, vehicle location, driver recognition corresponding to a start or an end of a known commute path, etc. From some or all of the aforementioned data, vehicle A 202 may infer that a door of vehicle A 202 is about to open.

Once the intent is determined, vehicle A 202 may inform other vehicles, such as vehicle B 204, of such an intent. For example, as shown in FIG. 4, vehicle A 202 may unicast a corresponding V2X action 208 including intent-related information, e.g., unicast a door opening alert to vehicle B 204 and/or other road users in the vicinity such as one or more VRUs 206 in the vicinity of vehicle A 202. Alternatively, however, vehicle A 202 may broadcast or multicast the corresponding V2X action 208, e.g., broadcast or multicast a door opening alert. Subsequent to communicating the intent, vehicle A 202 may engage in a negotiation with vehicle B 204 and/or the VRUs 206 regarding the intent of vehicle A 202 to open a door and the potential effect of the intent on the safety of vehicle B 204 and/or the VRUs 206.

For example, after vehicle B 204 receives a message (the V2X action 208) from vehicle A 202 indicating the maneuver intent, e.g., to open a door, vehicle B 204 may determine potential safety issues if vehicle A 202 proceeds to open a door. The potential safety issues may include, for example, insufficient time for vehicle B 204 to safely stop or change path. If there are safety issues associated with the maneuver, vehicle B 204 may send a unicast message to vehicle A 202 directing vehicle A 202 to cease the maneuver, i.e., to not open the door. In response, vehicle A 202 may send a unicast message to vehicle B 204 acknowledging and confirming cessation of maneuver, i.e., confirming that door will not be opened. The aforementioned example aspect is related to vehicle-to-vehicle communication. However, the present aspects are also applicable to communication with a VRU 206, such as a bicycle, scooter, pedestrian, if the VRU 206 is capable of such messaging.

Figure 5:
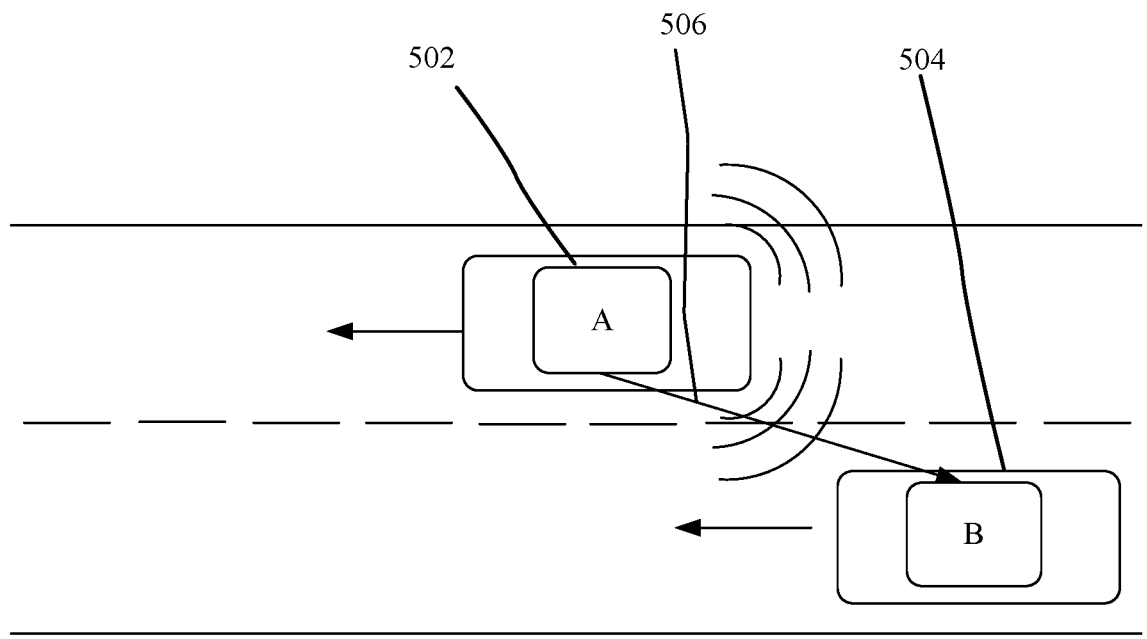
FIG. 5 is a schematic diagram of a third example system for interactive communication, according to some aspects.
Figure 6:
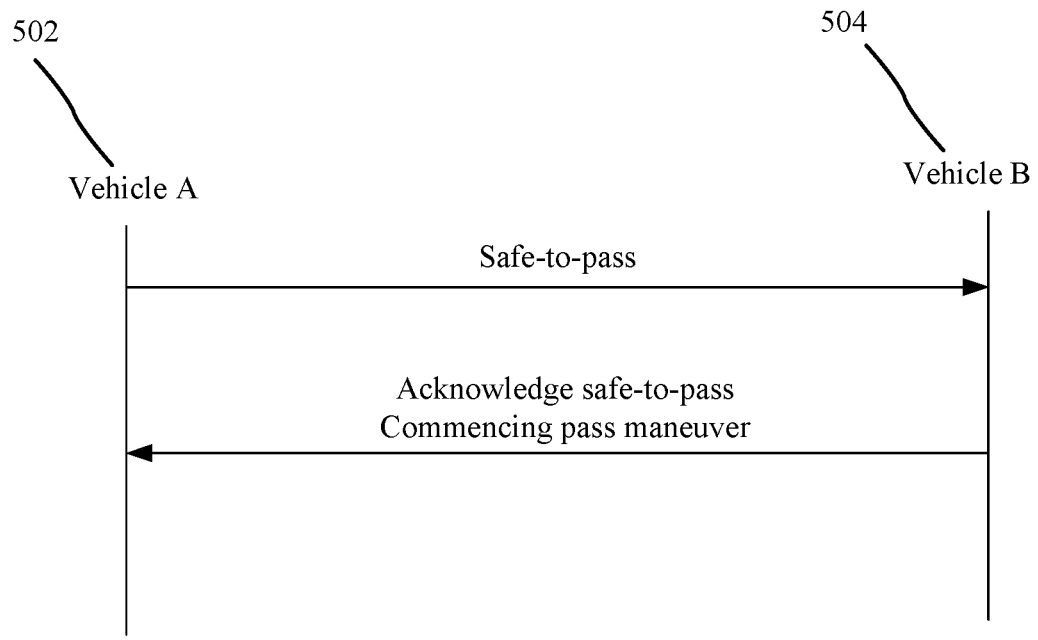
FIG. 6 is a message sequence diagram corresponding to the example system of FIG. 5, according to some aspects.

Referring to FIGS. 5 and 6, in another example aspect relating to a vehicle passing scenario, a vehicle may transmit an OK-to-pass confirmation based on detecting another vehicle in a blind spot. Currently, when two vehicles are travelling in adjacent lanes, the vehicle in the slower/right lane may be informed of a vehicle approaching to pass in the lane to the left using a Blind Spot Monitor (BSM) feature. However, the vehicle in the passing lane is not informed that the leading vehicle has made such a detection, or whether the leading vehicle is going to attempt a lane change during a pass maneuver. This may reduce the time and efficiency of passing maneuvers.

However, some present aspects provide blind spot sensor vehicle detection and for a corresponding V2X-based negotiation. For example, in an aspect, detecting a vehicle in a blind spot may trigger the transmission of a safe-to-pass V2X message from the detecting vehicle to the detected vehicle. In an aspect, for example, a vehicle may detect the presence of an approaching vehicle in an adjacent lane using sensors such as a rear-facing radar and/or rear-facing cameras. The leading vehicle may then determine that the approaching vehicle in the passing lane is nearing the blind spot of the leading vehicle or is already in the blind spot of the leading vehicle.

In an aspect, once the leading vehicle detects the presence of the approaching vehicle, the leading vehicle may perform corresponding V2X-based negotiation with the approaching vehicle. For example, the leading vehicle may signal the intent not to change lanes, i.e., a safe-to-pass signal, by sending a V2X unicast message to the approaching vehicle. In response, the approaching vehicle may acknowledge the safe-to-pass message and confirm the intent to pass. Alternatively and/or additionally, in some aspects, a safe-to-pass message may also be mediated by an infrastructure device, such as an RSU.

For example, referring to FIGS. 5 and 6, vehicle A 502 may receive sensor data corresponding to detecting vehicle B 504 in a blind spot of vehicle A 502, for example, by using a BSM such as a rear-facing radar and/or rear-facing cameras. In some alternative and/or additional aspects, vehicle A 502 may receive a request from vehicle B 504 to present the BSM results to the driver, such that vehicle A 502 can generate an OK-to-pass message to vehicle B 504. In response, vehicle A 502 may transmit a message 506, e.g., via unicast, to vehicle B 504 to indicate the intent to allow vehicle B 504 to safely pass, i.e., it is safe for vehicle B 504 to pass. Vehicle B 504 may in turn acknowledge the safe-to-pass message from vehicle A 502 and proceed to pass vehicle A 502.

Figure 7:
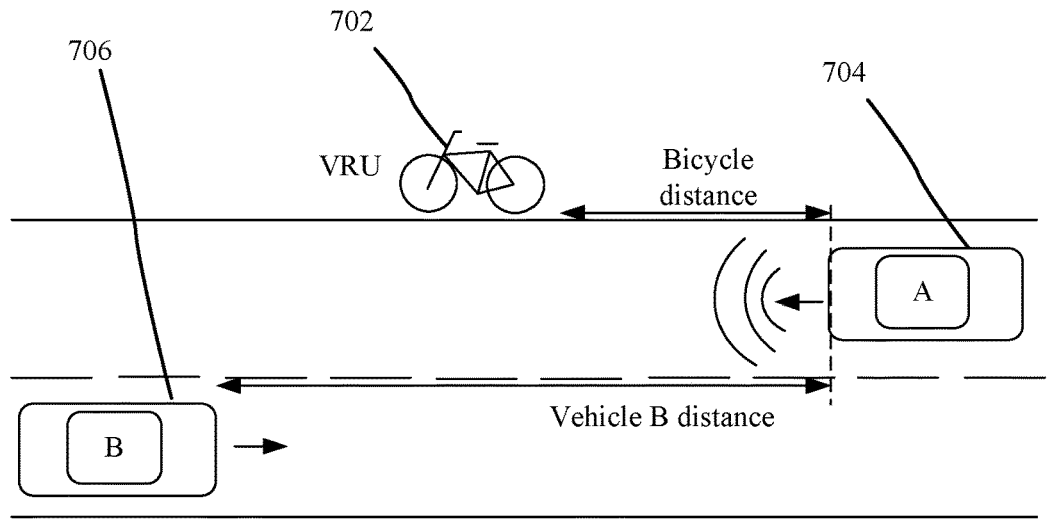
FIG. 7 is a schematic diagram of a fourth example system for interactive communication, according to some aspects.
Figure 8:
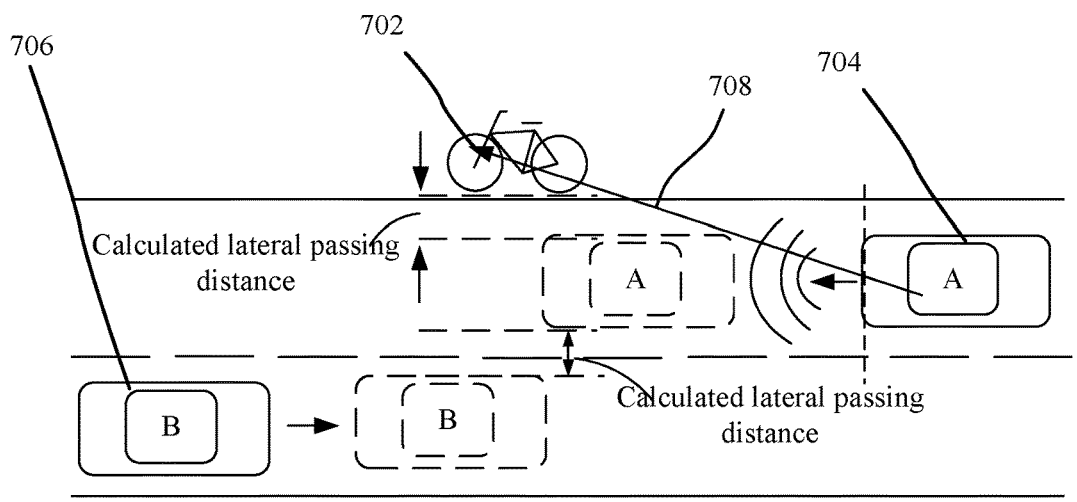
FIG. 8 is another schematic diagram of the fourth example system for interactive communication, according to some aspects.
Figure 9:
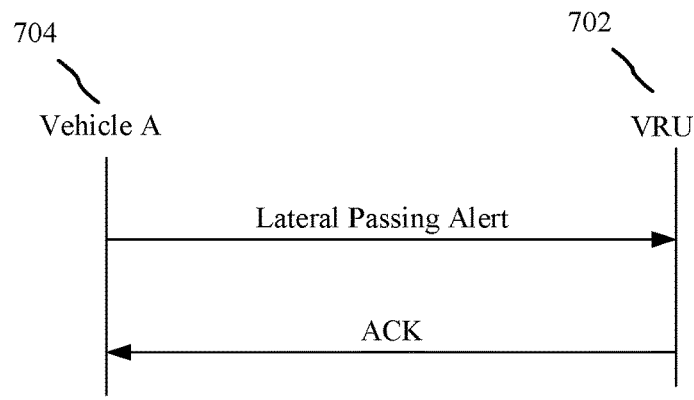
FIG. 9 is a message sequence diagram corresponding to the example system of FIGS. 7 and 8, according to some aspects.

Referring to FIGS. 7-9, in another example aspect relating to a lateral clearance scenario, a vehicle may provide a VRU lateral passing distance alert related to the intent to pass a VRU. Currently, a vehicle may inform other road users of an action only after the action has started. Such late informing may reduce the reaction time for VRUs and/or may result in unsafe actions by the vehicle. However, in some present aspects, a vehicle detecting VRUs, such as cyclists, scooters, segways, mopeds, pedestrians, etc., in the vehicle's planned path may inform the VRUs of the vehicle passing closely but safely. In an aspect, the vehicle may perform V2X negotiation with oncoming traffic based on vehicle-detected VRUs.

In an aspect, for example, a vehicle may detect the presence of a VRU using forward-facing sensors such as a radar or one or more cameras. The vehicle may also detect the presence of oncoming traffic, e.g., other vehicles. With the intent to pass the VRU, the vehicle may then calculate the expected lateral passing distance to the VRU, incorporating speed, heading of oncoming traffic and vehicle size, e.g., for a car, truck, etc. If the oncoming traffic is V2X-capable, the vehicle may refine the calculation based on the oncoming vehicle size, for example, as reported by the oncoming traffic. If the VRU is also V2X-capable, the vehicle may provide a passing intent-related alert to the VRU of with a message, e.g., via unicast, if the lateral passing distance is below a threshold. If the lateral passing distance is below a safe threshold, the vehicle may use intent-related V2X messages, e.g., via unicast, to negotiate with the oncoming vehicle a set of safe actions related to the intent to pass the VRU. In an aspect, for example, the set of safe actions may include, but are not limited to, The detecting vehicle slowing down until the oncoming vehicle passes, if there are no vehicles behind the oncoming vehicle.

The oncoming vehicle slowing down to allow the detecting vehicle to move laterally to safely pass the VRU.

The detecting vehicle and the oncoming vehicle both moving laterally to safely pass the VRU.

Accordingly, in some aspects, for example, the detecting vehicle and the oncoming vehicle may negotiate to avoid all three objects: (1) the detecting vehicle, (2) the oncoming vehicle, and (3) the VRU, to be aligned at the same time across the road. In some aspects, if there are other vehicles behind the detecting vehicle or the oncoming vehicle, the other vehicles may also be informed, via V2X communication, of actions they may need to take.

For example, referring to FIG. 7, vehicle A 704 may detect the presence of a VRU 702 using forward-facing sensors such as radar, LIDAR, cameras, etc., and may intend to pass the VRU 702. Vehicle A 704 may also detect lane markings, lane width, breakdown/bicycle lane, road markings or signage indicative of VRU lane, etc. Vehicle A 704 may also detect distance and speed of oncoming vehicle B 706.

Additionally, for example referring to FIG. 8, vehicle A 704 may perform event calculations related to an intended event to pass the VRU 702. For example, vehicle A 704 may calculate the lateral passing distance to the VRU 702 and to the oncoming vehicle B 706 at the time of passing the VRU 702.

Further, for example referring to both FIGS. 8 and 9, if vehicle A 704 determines that the calculated passing distance to the VRU 702 is less than a threshold, vehicle A 704 may send a passing intent-related V2X message 708 (e.g., in unicast) to the VRU 702 to alert the VRU 702.

Figure 10:
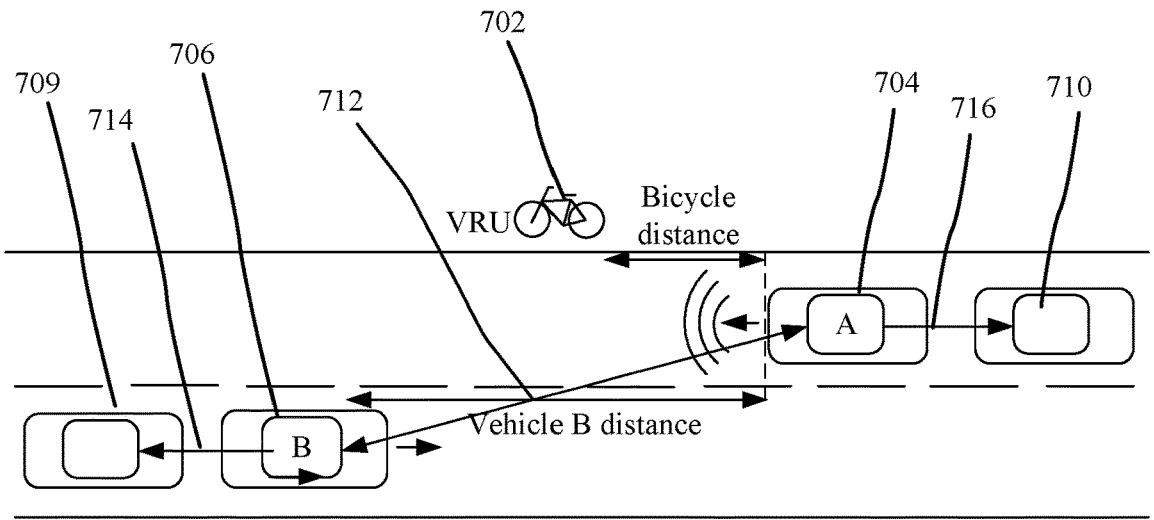
FIG. 10 is a further schematic diagram of the fourth example system for interactive communication, according to some aspects.
Figure 11:
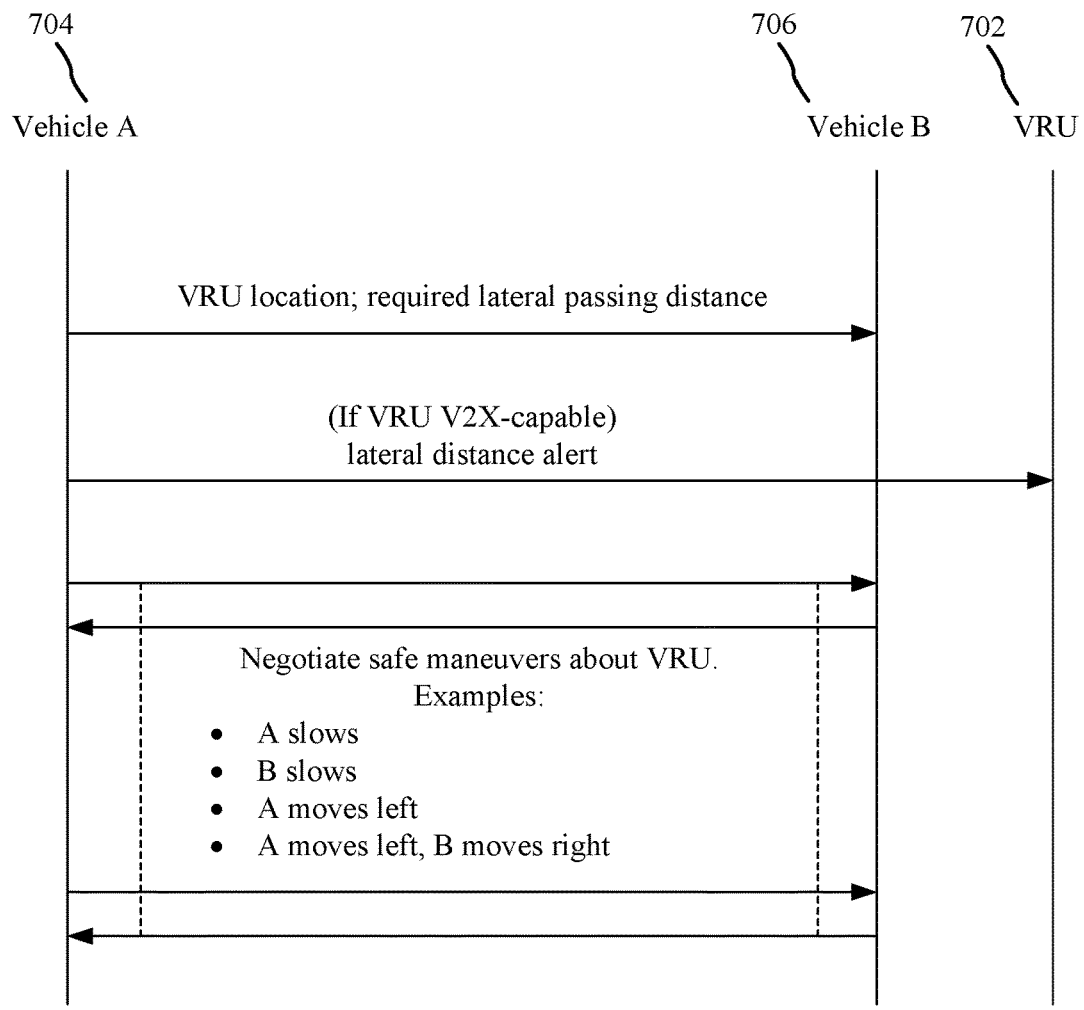
FIG. 11 is a message sequence diagram corresponding to the example system of FIG. 10, according to some aspects.

Referring to FIGS. 10 and 11, in another example aspect relating to a lateral clearance scenario, vehicle A 704 may perform intent-related V2X-based negotiation 712 with oncoming vehicle B 706 to ensure a safe passing distance with the VRU 702. For example, after determining that the calculated intended passing distance to the VRU 702 is less than a threshold, vehicle A 704 may determine unsafe lateral passing distance to the VRU 702, and may negotiate with vehicle B 706 to enable safe passing. For example, referring to both FIGS. 10 and 11, vehicle A 704 may inform vehicle B 706 of the VRU 702, e.g., a location, speed, heading size, etc., of the VRU 702. Subsequently, vehicle A 704 may use the intent-related V2X-based negotiation 712 (e.g., unicast) to negotiate with vehicle B 706 to maintain the lateral distance that vehicle A 704 requires to safely pass the VRU 702. For example, the negotiation may result in:

- Vehicle A 704 slowing down. Vehicle A 704 may need to inform vehicles 710 behind vehicle A 704 of the presence of the VRU 702 and the resulting action that vehicle A 704 is taking.
- Vehicle B 706 slowing down to allow vehicle A 704 to enter vehicle B's lane. Vehicle A 704 and vehicle B 706 may need to inform vehicles 709 and 710 behind them (via messages 714 and 716) of the presence of the VRU 702 and the resulting actions that vehicle A 704 and vehicle B 706 are taking.
- Vehicle A 704 and vehicle B 706 determine that it is safe for vehicle A 704 to move to the left, either within vehicle A's lane or entering vehicle B's lane.

In these aspects, the VRU 702 may not be required to be V2X-capable.

Figure 12:
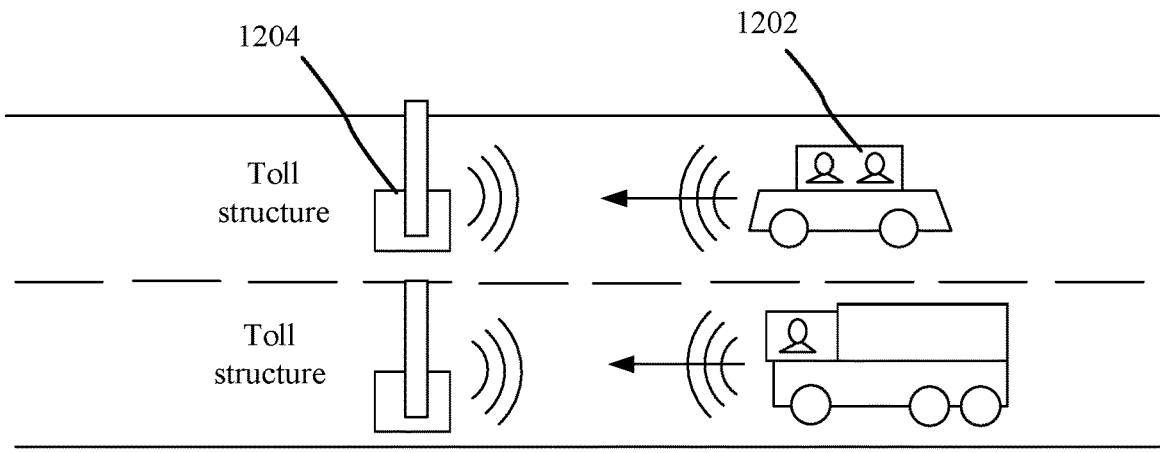
FIG. 12 is a schematic diagram of a fifth example system for interactive communication, according to some aspects.
Figure 13:
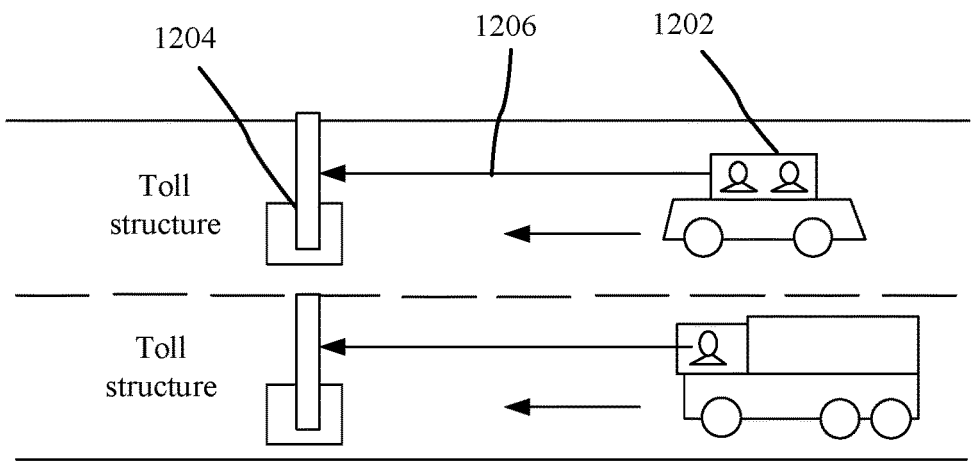
FIG. 13 is another schematic diagram of the fifth example system for interactive communication, according to some aspects.
Figure 14:
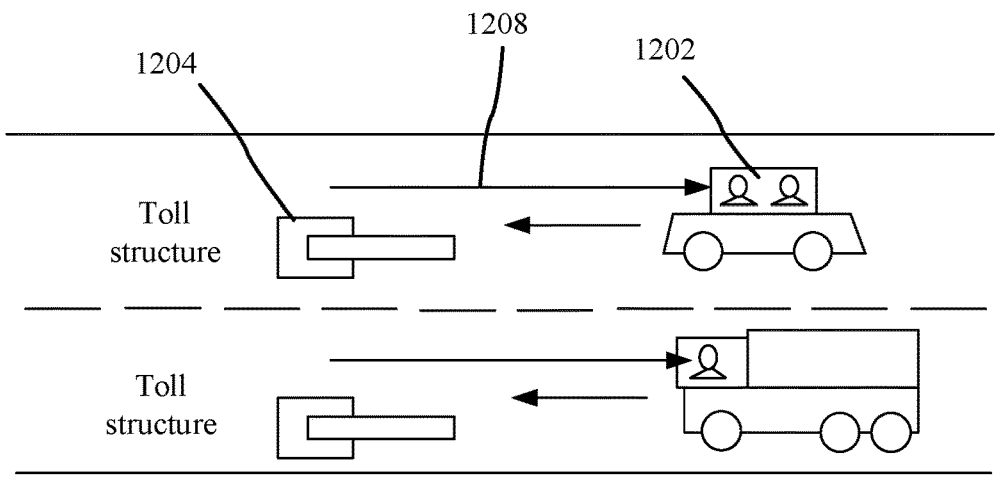
FIG. 14 is a further schematic diagram of the fourth example system for interactive communication, according to some aspects.

Referring to FIGS. 12-14, in another example aspect relating to a road usage and/or road toll payment intent scenario, V2X-managed toll road access is provided. For example, in FIG. 12, a vehicle 1202 may detect the presence of a toll structure 1204. The detection may be performed, for example, by a front-facing camera, a GNSS, or a V2X communication message. The vehicle 1202 may determine the number of occupants, for example, via a seat sensor, a seatbelt, an in-cabin camera, detection of communication devices associated with people, biometric sensors, voice detection, or another occupant detection mechanism. The vehicle 1202 may then take corresponding V2X actions related to the intent to pass the toll structure 1204. For example, in FIG. 13, the vehicle 1202 may transmit the number of occupants to the toll structure 1204 via a V2X message 1206. The vehicle 1202 may include the vehicle type in the transmission, e.g., indicating that the vehicle 1202 is a car or a truck, indicating the number of axles, etc. In response, the toll structure 1204 may also take V2X actions. For example, in FIG. 14, the toll structure 1204 may determine the toll based on vehicle type, occupancy, e.g., by applying car pool rates, etc., and may grant access to the vehicle 1202 and may transmit a corresponding V2X message 1208 to the vehicle 1202.

By allowing for automated toll calculation and/or payment, the above aspect may reduce the burden on an operator of the vehicle to manually provide toll-related information and make a payment. Additionally, the above aspect may avoid the event where a vehicle is billed by a toll pass system and also erroneously fined by the toll structure 1204 based on a picture of a license plate.

Figure 15:
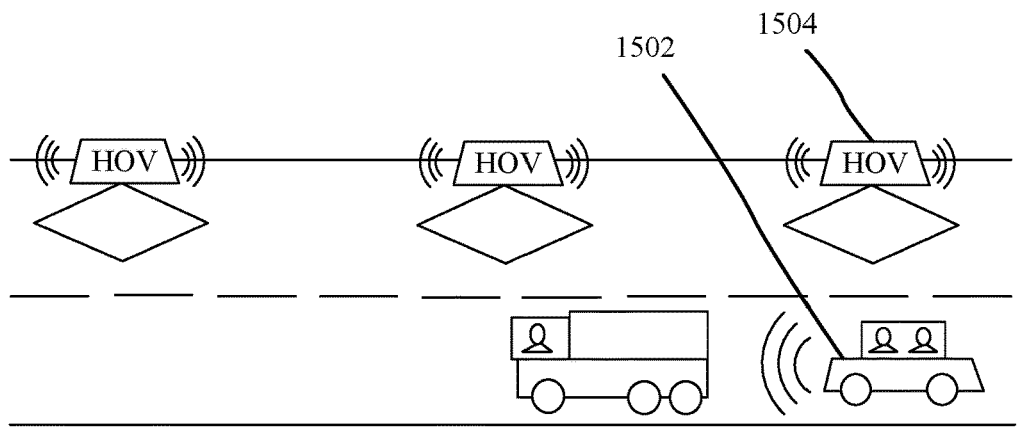
FIG. 15 is a schematic diagram of a sixth example system for interactive communication, according to some aspects.
Figure 16:
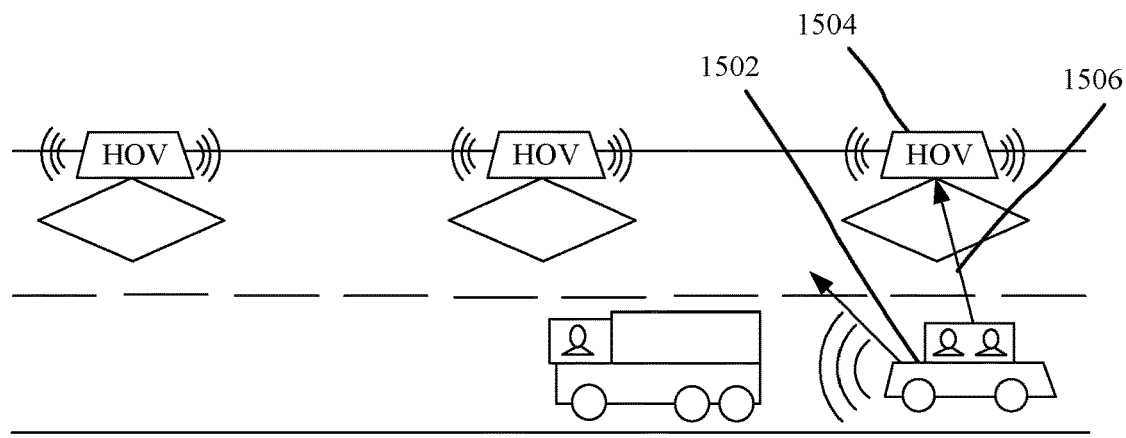
FIG. 16 is another schematic diagram of the sixth example system for interactive communication, according to some aspects.
Figure 17:
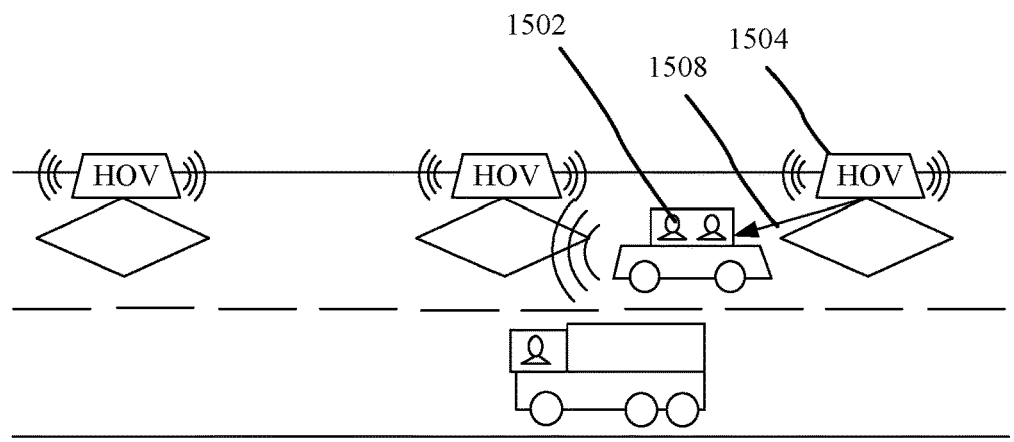
FIG. 17 is a further schematic diagram of the sixth example system for interactive communication, according to some aspects.

Referring to FIGS. 15-17, in another aspect relating to a road access scenario, V2X-managed HOV access is provided. For example, in FIG. 15, a vehicle 1502 or a driver of the vehicle 1502 may detect the presence of an HOV lane. The detection may be performed, for example, visually by a human driver, or may be sensor-based by a camera, a GNSS, or a V2X communication message. The vehicle 1502 may determine the number of occupants and take corresponding V2X actions related to the intent to enter the detected HOV lane. For example, in FIG. 16, the vehicle 1502 may transmit the number of occupants to an HOV structure 1504 via a V2X message 1506. The vehicle 1502 may include the vehicle type in the transmission, e.g., indicating that the vehicle 1502 is a car or a truck, indicating the number of axles, etc. In response, the HOV structure 1504 may also take V2X actions related to the intent of the vehicle 1502 to enter the HOV lane. For example, in FIG. 17, the HOV structure 1504 may determine HOV access based on vehicle type, occupancy, etc., and may indicate HOV access to the vehicle 1502, e.g., by transmitting a corresponding V2X message 1508 to the vehicle 1502.

In some alternative and/or additional aspects, for example, the determination of the number of occupants by the vehicle 1202 (FIGS. 12-14) or by the vehicle 1502 (FIGS. 15-17) may be performed using a software environment that is trusted by an applicable one of the toll structure 1204 (FIGS. 12-14) or the HOV structure 1504 (FIGS. 15-17), for example, based on a signature of the determining software infrastructure on the report of the number of occupants.

In some alternative and/or additional aspects, for example, the determination of the number of occupants may be performed by an applicable one of the toll structure 1204 (FIGS. 12-14) or the HOV structure 1504 (FIGS. 15-17) by applying image processing techniques to images of the inside of the vehicle 1202 (FIGS. 12-14) or the vehicle 1502 (FIGS. 15-17) obtained using an in-car camera. In these aspects, the vehicle 1202 (FIGS. 12-14) or the vehicle 1502 (FIGS. 15-17) may modify such images, e.g., mask the faces of the occupants, before sending the images to an applicable one of the toll structure 1204 (FIGS. 12-14) or the HOV structure 1504 (FIGS. 15-17), so that the privacy of the occupants is ensured.

In some alternative and/or additional aspects, the toll structure 1204 (FIGS. 12-14) and/or the HOV structure 1504

(FIGS. 15-17) may also include cameras or other sensors that provide sensor data, and the toll structure 1204 (FIGS. 12-14) and/or the HOV structure 1504 (FIGS. 15-17) may combine the further sensor data with information received from an applicable one of the vehicle 1202 (FIGS. 12-14) or the vehicle 1502 (FIGS. 15-17) to make a determination regarding an applicable one of a toll decision or an HOV decision.

In some aspects, the toll structure 1204 (FIGS. 12-14) and/or the HOV structure 1504 (FIGS. 15-17) are at least partially V2X-capable, e.g., have at least V2X communication capability, to interact with the vehicle 1202 (FIGS. 12-14) or the vehicle 1502 (FIGS. 15-17).

In some aspects, the intent of the vehicle 1202 (FIGS. 12-14) to pass the toll structure 1204 (FIGS. 12-14) and/or the intent of the vehicle 1502 (FIGS. 15-17) to enter an HOV lane may be explicitly announced by the vehicle 1202 (FIGS. 12-14) or the vehicle 1502 (FIGS. 15-17), for example, based on some other information that the vehicle 1202 (FIGS. 12-14) or the vehicle 1502 (FIGS. 15-17) provides about their location. Alternatively and/or additionally, the intent of the vehicle 1202 (FIGS. 12-14) to pass the toll structure 1204 (FIGS. 12-14) and/or the intent of the vehicle 1502 (FIGS. 15-17) to enter an HOV lane may be implicitly derived from the location of the vehicle 1202 (FIGS. 12-14) or the vehicle 1502 (FIGS. 15-17) and/or based on some other information that the vehicle 1202 (FIGS. 12-14) or the vehicle 1502 (FIGS. 15-17) provide about their location and/or based on sensor data from sensors such as cameras installed at the toll structure 1204 (FIGS. 12-14) and/or the HOV structure 1504 (FIGS. 15-17). For example, as compared to the aspects described herein with reference to FIGS. 2-11 where a vehicle provides "push" information ("pushes" information) indicating an intent, in the aspects described herein with reference to FIGS. 12-17, a vehicle may provide "pull" information indicating an intent, i.e., the vehicle is "pulled" or triggered or otherwise requested to provide intent-related information.

Figure 18:
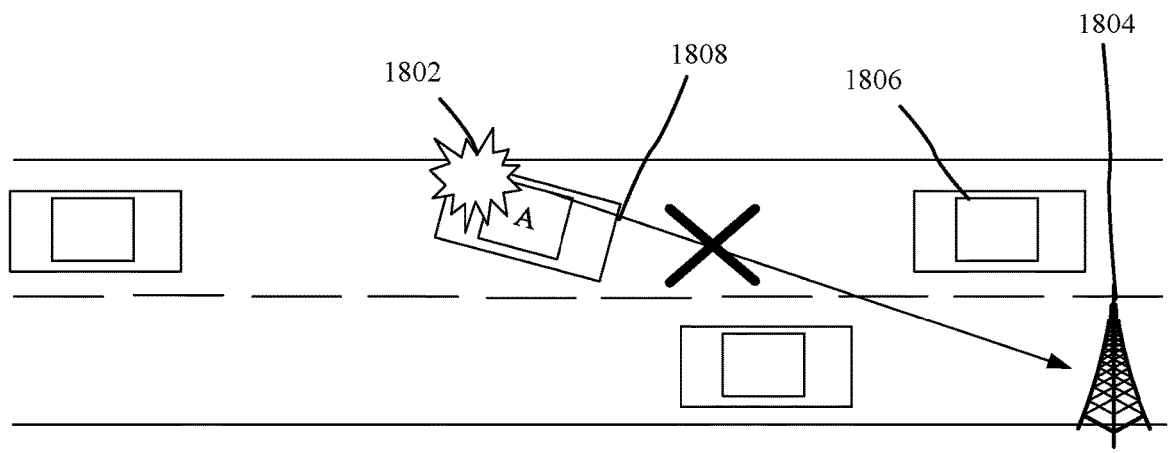
FIG. 18 is a schematic diagram of a seventh example system for interactive communication, according to some aspects.
Figure 19:
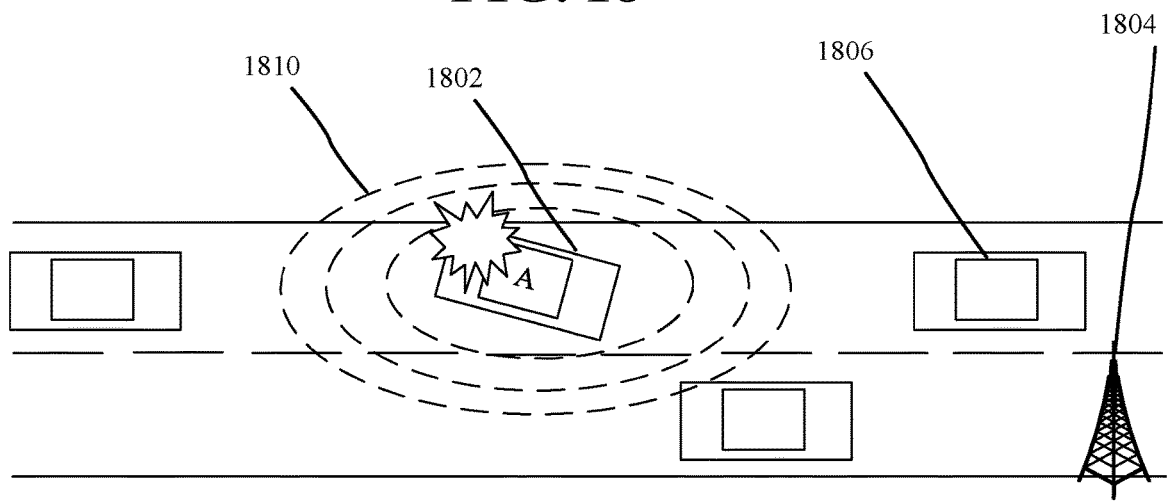
FIG. 19 is another schematic diagram of the seventh example system for interactive communication, according to some aspects.
Figure 20:
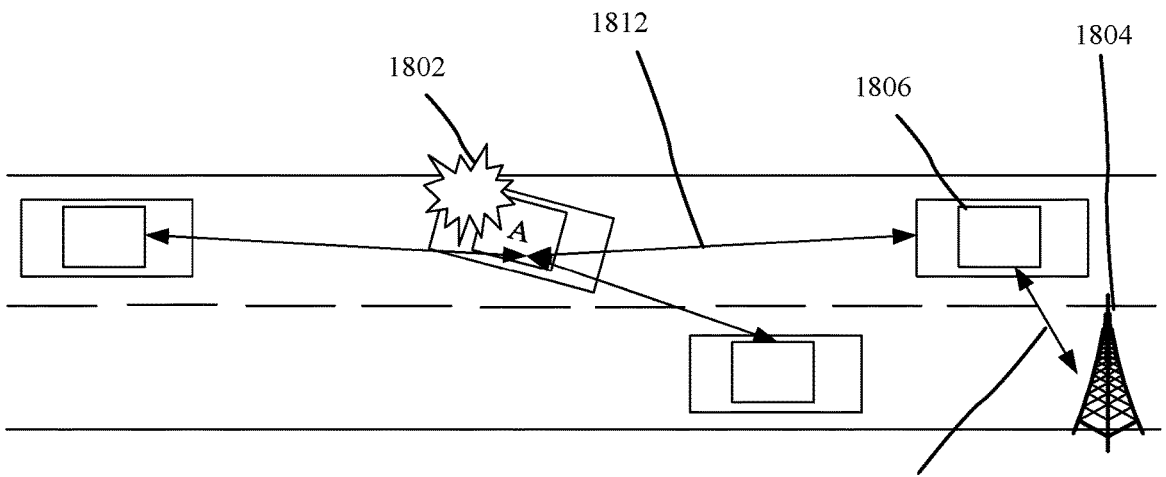
FIG. 20 is a further schematic diagram of the seventh example system for interactive communication, according to some aspects.

Referring to FIGS. 18-20, in another example aspect relating to a call initiation or notification scenario, V2X communication may be used to delegate an eCall or alert other vehicles of a performed eCall. For example, in FIG. 18, vehicle A 1802 may determine collision occurrence, and may attempt an eCall 1808 by accessing a base station 1804. If the eCall 1808 fails, vehicle A 1802 may send an eCall intent-related V2X request 1810 to delegate the eCall to another vehicle. For example, in FIG. 19, vehicle A 1802 may broadcast the eCall intent-related request 1810 to delegate the eCall to adjacent vehicles 1806 in the vicinity. Vehicle A 1802 may include the vehicle type in the transmission, e.g., the vehicle is a car or truck, the number of axles of the vehicle, etc. Alternatively, the eCall intent-related V2X request 1810 may also be initiated by a non-vehicle V2X entity, such as a VRU or an RSU. In some aspects, an eCall attempt by vehicle A 1802 may have failed due to, for example, damage to an antenna or other device in vehicle A 1802. However, vehicle A 1802 may still have V2X communication capability as V2X communication does not require the high power or the cell connectivity requirements of cellular communication. That is, even with damage due to a collision, vehicle A 1802 may still have V2X communication capability, possibly with a reduced and limited range, to perform V2X communication according to the aspects described above.

After sending the eCall intent-related V2X request 1810, for example, in FIG. 20, vehicle A 1802 and the adjacent vehicles 1806 may perform an eCAll intent-related V2X-based negotiation 1812 for eCall initiation. For example, the adjacent vehicles 1806 may negotiate with vehicle A 1802 over V2X for receiving additional collision or vehicle-specific data. The adjacent vehicles 1806 may also negotiate among each other to select one of the adjacent vehicles 1806 for initiating the delegated eCall 1814 to a public-safety answering point (PSAP).

In an aspect, the adjacent vehicles 1806 may first negotiate among each other to select one of the adjacent vehicles 1806 for initiating the delegated eCall 1814, and then the selected adjacent vehicle may negotiate with vehicle A 1802 over V2X (e.g., the eCall intent-related V2X-based negotiation 1812) for receiving additional collision or vehicle-specific data. Accordingly, by sending the additional collision or vehicle-specific data and any subsequent verifications only to the selected adjacent vehicle and not to all adjacent vehicles, vehicle and network resources such as power, bandwidth, and computing resources may be saved.

Alternatively, when vehicle A 1802 determines collision occurrence, vehicle A 1802 may be subsequently able to establish a successful eCall. Alternatively, the eCall may be established by a non-V2X entity or a non-vehicle V2X entity (e.g., the driver or a passenger of vehicle A 1802 makes an eCall and then manually indicates to vehicle A 1802 that an eCall has been made). Then, vehicle A 1802 may broadcast a V2X message to indicate the successful eCall being placed. The broadcast message may also include collision/accident-specific details. Alternatively and/or additionally, collision/accident-specific details may be sent by a non-V2X entity or a non-vehicle V2X entity such as a VRU. Upon receiving the broadcast message indicating the successful eCall being placed, the adjacent vehicles 1806 determine not to initiate any further eCalls related to the same collision, thereby avoiding unnecessary communication and reducing network load and minimizing the chance of blocking. Specifically, subsequent to the successful eCall, vehicle A 1802 may further communicate with the base station 1804 regarding the collision, and therefore suppressing other eCalls by other vehicles allows for lower chance of blocking of vehicle A 1802 due to, for example, network congestion.

Figure 21:
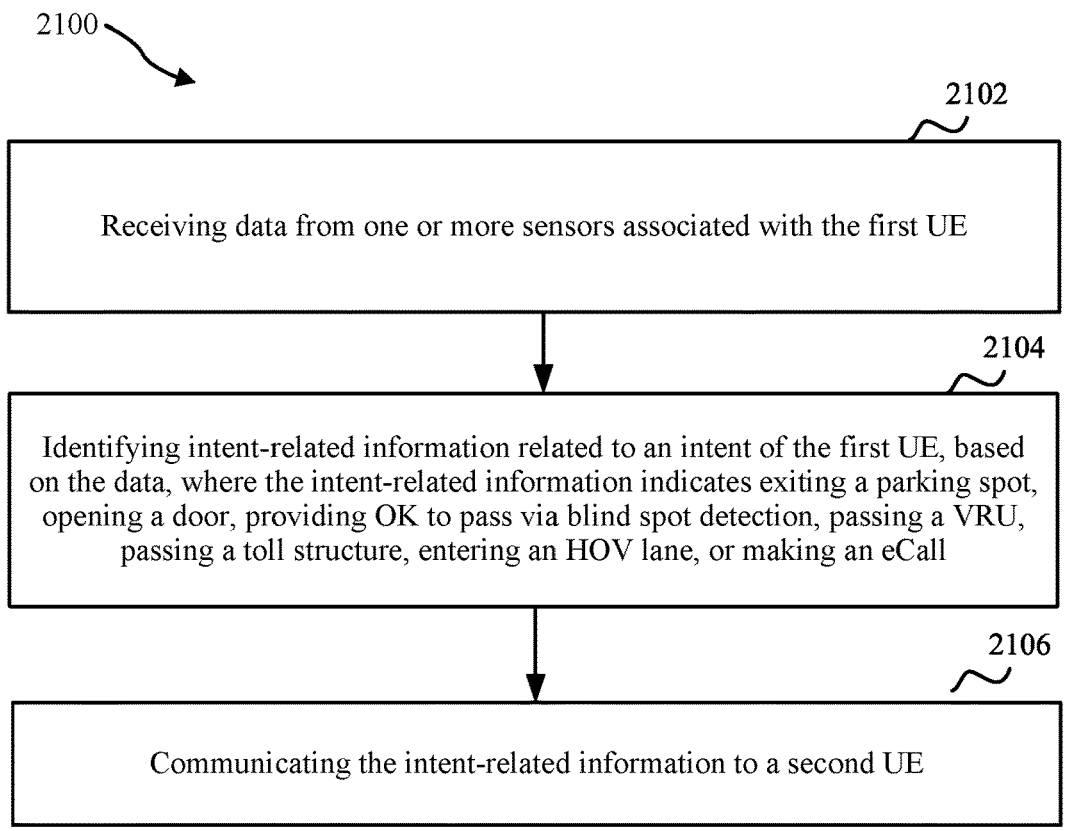
FIG. 21 is a flowchart of an example method of interactive communication, according to some aspects.
Figure 22:
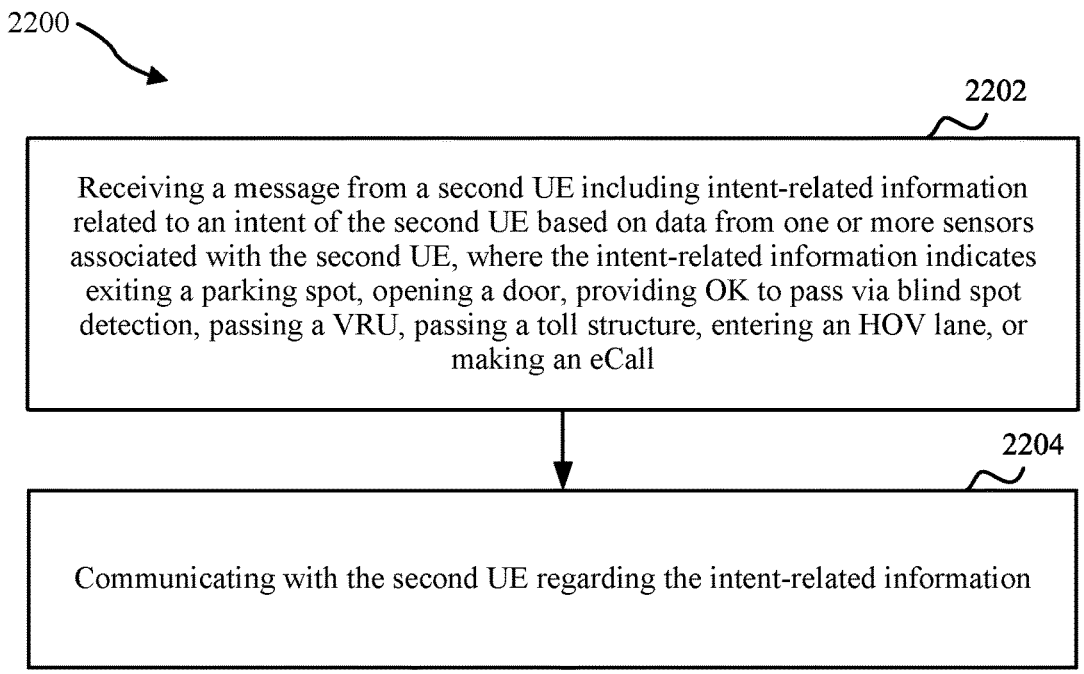
FIG. 22 is a flowchart of another example method of interactive communication, according to some aspects.

Referring to FIGS. 21 and 22, methods 2100 and 2200 for interactive V2X communication may be performed by an apparatus such as a UE 104, or more particularly, such as the interactive communication component 140 being executed by a processor 812 of a UE 104 as described herein with reference to FIG. 23 below. In an aspect, for example, each of the methods 2100 or 2200 of interactive V2X communication may be performed by a UE 104 which may include a memory 816 (FIG. 23) and may be the entire UE 104 or a component of the UE 104 such as the interactive communication component 140, the modem 814 (FIG. 23), the processor 812 (FIG. 23), the transceiver 802 (FIG. 23), etc.

In FIG. 21, the method 2100 may be performed by a UE that includes the sensors having the data used to determine the intent (as determined by the UE, and/or as received from another device, e.g., an RSU, after forwarding the relevant sensor data).

At block 2102 the method 2100 for wireless communication at a first UE may include receiving data from one or more sensors associated with the first UE. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may receive data from one or more sensors associated with the UE 104. Accordingly, a UE 104, and/or a component of a UE 104 such as the interactive communication component 140, the modem 814 (FIG. 23), the processor 812 (FIG. 23), the transceiver 802 (FIG. 23), etc., may provide means for receiving data from one or more sensors associated with the first UE. In an aspect, for example, as described herein with reference to FIG. 1, the UE 148, and/or a component of the UE 148 such as the interactive communication component 140, the modem 814 (FIG. 23), the processor 812 (FIG. 23), or the transceiver 802 (FIG. 23), may receive the sensor data 142 from one or more sensors configured to detect an object, status, or event related to the UE 148 or related to a surrounding of the UE 148.

At block 2104 the method 2100 may further include identifying intent-related information related to an intent of the first UE, based on the data, where the intent-related information indicates exiting a parking spot, opening a door, providing OK to pass via blind spot detection, passing a VRU, passing a toll structure, entering an HOV lane, or making an eCall. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may identify intent-related information related to an intent of the first UE, based on the data, where the intent-related information indicates exiting a parking spot, opening a door, providing OK to pass via blind spot detection, passing a VRU, passing a toll structure, entering an HOV lane, or making an eCall. Accordingly, a UE 104, and/or a component of a UE 104 such as the interactive communication component 140 (FIG. 23), the modem 814 (FIG. 23), the processor 812 (FIG. 23), the transceiver 802 (FIG. 23), etc., may provide means for identifying intent-related information related to an intent of the first UE, based on the data, where the intent-related information indicates exiting a parking spot, opening a door, providing OK to pass via blind spot detection, passing a VRU, passing a toll structure, entering an HOV lane, or making an eCall. For example, in an aspect, the intent-related information may be an intent indicator (e.g., the various messages, alerts, etc., as described herein with reference to various aspects) or may be the actual set of sensor data that can be used by another device, e.g., an RSU, to determine, infer, derive, predict, etc., the intent and send the intent back to the first UE.

At block 2106 the method 2100 may further include communicating the intent-related information to a second UE. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may communicate the intent-related information to a second UE (e.g., the UE 149). Accordingly, a UE 104, and/or a component of a UE 104 such as the interactive communication component 140, the modem 814 (FIG. 23), the processor 812 (FIG. 23), the transceiver 802 (FIG. 23), etc., may provide means for communicating the intent-related information to a second UE. In an aspect, for example, as described herein with reference to FIG. 1, the UE 148, and/or a component of the UE 148 such as the interactive communication component 140, the negotiation component 146, the modem 814 (FIG. 23), the processor 812 (FIG. 23), or the transceiver 802 (FIG. 23), may communicate the intent-related information 145 with the UE 149, and the interactive communication component 140 in the UE 149 may also include at least the negotiation component 146 configured to receive the intent-related information 145 and support the interaction/negotiation with the UE 148 regarding the intent of the UE 148.

Optionally, the method 2100 may further include receiving an unsolicited indicator from the second UE, where the unsolicited indicator is configured to help or trigger the identifying of the intent-related information. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may receive an unsolicited indicator from the second UE, where the unsolicited indicator is configured to help or trigger the identifying of the intent-related information. Accordingly, a UE 104, and/or a component of a UE 104 such as the interactive communication component 140, the modem 814 (FIG. 23), the processor 812 (FIG. 23), the transceiver 802 (FIG. 23), etc., may provide means for receiving an unsolicited indicator from the second UE, where the unsolicited indicator is configured to help or trigger the identifying of the intent-related information. In an aspect, for example, the UE 148 (FIG. 1) or a component of the UE 148 (FIG. 1), such as the interactive communication component 140 (FIG. 23), the intent derivation component 144 (FIG. 23), the negotiation component 146 (FIG. 23), the modem 814 (FIG. 23), the processor 812 (FIG. 23), or the transceiver 802 (FIG. 23), may receive an unsolicited indicator from the UE 149 to help or trigger the identifying of the intent-related information 145 (FIG. 23), and the interactive communication component 140 (FIG. 23) in the UE 149 (FIG. 1) may also include at least the negotiation component 146 (FIG. 23) configured to send such unsolicited indicator to the UE 148 (FIG. 23).

Optionally, the identifying of the intent-related information may include transmitting the data from the one or more sensors to another device; and receiving the intent-related information from the another device in response to the data. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may identify the intent-related information by transmitting the data from the one or more sensors to another device; and receiving the intent-related information from the another device in response to the data. Accordingly, a UE 104, and/or a component of a UE 104 such as the interactive communication component 140, the modem 814 (FIG. 23), the processor 812 (FIG. 23), the transceiver 802 (FIG. 23), etc., may provide means for identifying the intent-related information by transmitting the data from the one or more sensors to another device; and receiving the intent-related information from the another device in response to the data. In an aspect, for example, as described herein with reference to FIG. 1, the UE 148, and/or a component of the UE 148 such as the interactive communication component 140, the intent derivation component 144, the negotiation component 146, the modem 814 (FIG. 23), the processor 812 (FIG. 23), or the transceiver 802 (FIG. 23), may transmit the sensor data 142 to another device, such as but not limited to an RSU 147, and in response may receive intent-related information related to the intent of the UE 148, where the intent-related information is identified by the RSU 147 based on the data. In an aspect, for example, the intent-related information received from the RSU 147 may include the intent indicator 143, which the intent derivation component 144 can decode to identify the intent of the UE 148.

Optionally, the another device may be an infrastructure device, an RSU, or an MEC platform.

Optionally, the intent-related information may include an intent indicator identifying the intent of the first UE.

Optionally, the one or more sensors may be configured to detect an object, status, or event related to the first UE or related to a surrounding of the first UE. In an aspect, for example, as described herein with reference to FIG. 1, the sensor data 142 may be generated by various sensors associated with the UE 148, such as a camera, radar, or LIDAR configured to monitor an object inside or outside the vehicle, a proximity sensor configured to detect an object inside or outside the vehicle, sensors detecting driving data such as speed, trajectory, fuel level, etc., vehicle internal and status sensors such as tire-pressure sensors, engine status (e.g., overheating, oil pressure, yaw, roll, pitch, lateral acceleration), a proximity sensor configured to detect seatbelt status or seat occupancy status, sensors detecting a driver's hands on a steering wheel, an in-cabin camera, voice detection sensors, ultrasonic sensors (used for example in parking assist functions), etc.

Optionally, the identifying at block 2104 may include at least one of performing sensor fusion on the data; or applying machine learning to the data. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may at least one of perform sensor fusion on the data; or apply machine learning to the data. Accordingly, a UE 104, and/or a component of a UE 104 such as the interactive communication component 140, the modem 814 (FIG. 23), the processor 812 (FIG. 23), the transceiver 802 (FIG. 23), etc., may provide means for at least one of performing sensor fusion on the data; or applying machine learning to the data. For example, in an aspect, a UE 104 (which may be the UE 148 in FIG. 1), and/or a component of a UE 104 such as the interactive communication component 140 (FIG. 23), the modem 814 (FIG. 23), the processor 812 (FIG. 23), the transceiver 802 (FIG. 23), etc., may generate meaningful events/information for V2X communication based on sensor fusion, which includes the combining and analysis of data from various sensors in order to determine and/or predict an impending maneuver or action, e.g., an intent. In an aspect, for example, useful events about the driver's intention are created/predicted based on input from multiple in-car sensors. In some implementations, for example, the inputs from the sensors may be directly used to infer the intent. In other examples, inputs from multiple sensors when matching a preset sequence(s) of events allows for an intent to be derived. Alternatively and/or additionally, in some aspect, a UE 104 (which may be the UE 148 in FIG. 1), and/or a component of a UE 104 such as the interactive communication component 140 (FIG. 23), the modem 814 (FIG. 23), the processor 812 (FIG. 23), the transceiver 802 (FIG. 23), etc., may apply machine learning mechanisms to the sensor data to derive certain events based on, but not limited to, identifying the vehicle driver and the habits or driving history of the individual driver user or driver users of a vehicle; or, in the event of an autonomously driven vehicle, the habits of a passenger or passengers or the vehicle driving history.

Optionally, the communicating at block 2106 may include broadcasting, unicasting, or multicasting a V2X message including the intent-related information. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may broadcast, unicast, or multicast a V2X message including the intent-related information. Accordingly, a UE 104, and/or a component of a UE 104 such as the interactive communication component 140, the modem 814 (FIG. 23), the processor 812 (FIG. 23), the transceiver 802 (FIG. 23), etc., may provide means for broadcasting, unicasting, or multicasting a V2X message including the intent-related information. For example, in an aspect, as described herein with reference to FIG. 2, the vehicle A 202, and/or a component of the vehicle A 202 such as the interactive communication component 140 (FIG. 23), the modem 814 (FIG. 23), the processor 812 (FIG. 23), the transceiver 802 (FIG. 23), etc., may broadcast or multicast the V2X action 208, e.g., broadcast or multicast an alert of parking exit. Subsequent to communicating the intent, vehicle A 202 may engage in a negotiation with vehicle B 204 and/or the VRUs 206 regarding the intent of vehicle A 202 to exit a parking spot and the potential effect of the intent on the safety of vehicle B 204 and/or the VRUs 206. In another aspect, for example, as described herein with reference to FIG. 4, the vehicle A 202, and/or a component of the vehicle A 202 such as the interactive communication component 140 (FIG. 23), the modem 814 (FIG. 23), the processor 812 (FIG. 23), the transceiver 802 (FIG. 23), etc., may unicast a corresponding V2X action 208 including intent-related information, e.g., may unicast a door opening alert to vehicle B 204 and/or other road users in the vicinity such as one or more VRUs 206 in the vicinity of vehicle A 202.

Optionally, the communicating at block 2106 may include performing a V2X communication via a network, an infrastructure, an RSU, a relay, or a wide area network (WAN) connection comprising Uu connectivity, where the V2X communication comprises the intent-related information. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may perform a V2X communication via a network, an infrastructure, an RSU, a relay, or a WAN connection comprising Uu connectivity, where the V2X communication comprises the intent-related information. Accordingly, a UE 104, and/or a component of a UE 104 such as the interactive communication component 140, the modem 814 (FIG. 23), the processor 812 (FIG. 23), the transceiver 802 (FIG. 23), etc., may provide means for performing a V2X communication via a network, an infrastructure, an RSU, a relay, or a WAN connection comprising Uu connectivity, where the V2X communication comprises the intent-related information. For example, in one non-limiting aspect, as described herein with reference to FIG. 1, the UE 148, and/or a component of the UE 148 such as the interactive communication component 140, the modem 814 (FIG. 23), the processor 812 (FIG. 23), the transceiver 802 (FIG. 23), etc., may share intent-related information 145, including sensor data 142 and/or a corresponding intent indicator 143 that is based on the sensor data 142, with the UE 149 via interactive V2X communications, and the V2X communications may include, for example, D2D communication links 158 in a D2D communications system 141. Alternatively and/or additionally, the V2X communications may be sent via the network, or may be relayed, for example, by the RSU 147.

Optionally, the intent-related information may indicate a physical maneuver of the first UE or an apparatus associated with the first UE, and the method 2100 may further include negotiating the physical maneuver with the second UE. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may negotiate the physical maneuver with the second UE. Accordingly, a UE 104, and/or a component of a UE 104 such as the interactive communication component 140, the modem 814 (FIG. 23), the processor 812 (FIG. 23), the transceiver 802 (FIG. 23), etc., may provide means for negotiating the physical maneuver with the second UE. For example, in an aspect, as described herein with reference to FIG. 2, the vehicle A 202, and/or a component of the vehicle A 202 such as the interactive communication component 140 (FIG. 23), the modem 814 (FIG. 23), the processor 812 (FIG. 23), the transceiver 802 (FIG. 23), etc., may engage in a negotiation with vehicle B 204 and/or the VRUs 206 regarding the intent of vehicle A 202 to exit a parking spot and the potential effect of the intent on the safety of vehicle B 204 and/or the VRUs 206.

Optionally, the negotiating may include receiving a request from the second UE to cease the physical maneuver; and sending a confirmation message to the second UE to confirm cessation of the physical maneuver. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may receive a request from the second UE to cease the physical maneuver; and send a confirmation message to the second UE to confirm cessation of the physical maneuver. Accordingly, a UE 104, and/or a component of a UE 104 such as the interactive communication component 140, the modem 814 (FIG. 23), the processor 812 (FIG. 23), the transceiver 802 (FIG. 23), etc., may provide means for receiving a request from the second UE to cease the physical maneuver; and sending a confirmation message to the second UE to confirm cessation of the physical maneuver. For example, in an aspect, as described herein with reference to FIG. 3, the vehicle A 202, and/or a component of the vehicle A 202 such as the interactive communication component 140 (FIG. 23), the modem 814 (FIG. 23), the processor 812 (FIG. 23), the transceiver 802 (FIG. 23), etc., may receive a message (e.g., via unicast) from vehicle B 204 directing vehicle A 202 to cease a maneuver when vehicle B 204 determines potential safety issues if vehicle A 202 proceeds with the maneuver, e.g., exits a parking spot. In response, vehicle A 202, and/or a component of vehicle A 202 such as the interactive communication component 140 (FIG. 23), the modem 814 (FIG. 23), the processor 812 (FIG. 23), the transceiver 802 (FIG. 23), etc., may send a message (e.g., via unicast) to vehicle B 204 acknowledging and confirming cessation of maneuver.

Optionally, the negotiating may include receiving a request from the second UE to modify the physical maneuver; and sending a confirmation message to the second UE to confirm modification of the physical maneuver. For example, in an aspect, a UE 104 (which may be the UE 148 in FIG. 1), and/or a component of a UE 104 such as the interactive communication component 140, the modem 814 (FIG. 23), the processor 812 (FIG. 23), the transceiver 802 (FIG. 23), etc., may receive a request from the second UE to modify the physical maneuver; and send a confirmation message to the second UE to confirm modification of the physical maneuver. Accordingly, a UE 104, and/or a component of a UE 104 such as the interactive communication component 140, the modem 814 (FIG. 23), the processor 812 (FIG. 23), the transceiver 802 (FIG. 23), etc., may provide means for receiving a request from the second UE to modify the physical maneuver; and sending a confirmation message to the second UE to confirm modification of the physical maneuver. For example, in an aspect, as described herein with reference to FIGS. 10 and 11, the vehicle A 704, and/or a component of the vehicle A 704 such as the interactive communication component 140 (FIG. 23), the modem 814 (FIG. 23), the processor 812 (FIG. 23), the transceiver 802 (FIG. 23), etc., may perform intent-related V2X-based negotiation 712 with oncoming vehicle B 706 to ensure a safe passing distance with the VRU 702. For example, after determining that the calculated intended passing distance to the VRU 702 is less than a threshold, vehicle A 704 may determine unsafe lateral passing distance to the VRU 702, and may negotiate with vehicle B 706 to enable safe passing by modifying a physical maneuver, e.g., Vehicle A 704 slowing down, and may send a confirmation message to vehicle B 706 to confirm the modification of the maneuver.

In FIG. 22, the method 2200 may be performed by a first UE in communication (e.g., via a vehicular communication system or technology) with a second UE that includes the sensors having the data to determine the intent of the second UE.

At block 2202 the method 2200 of wireless communication at a first UE may include receiving a message from a second UE including intent-related information related to an intent of the second UE based on data from one or more sensors associated with the second UE, where the intent-related information indicates exiting a parking spot, opening a door, providing OK to pass via blind spot detection, passing a VRU, passing a toll structure, entering an HOV lane, or making an eCall. For example, in an aspect, a UE 104 (which may be the UE 149 in FIG. 1), and/or a component of a UE 104 such as the interactive communication component 140 (FIG. 23), the modem 814 (FIG. 23), the processor 812 (FIG. 23), the transceiver 802 (FIG. 23), etc., may receive a message from a second UE (which may be the UE 148 at FIG. 1) including intent-related information related to an intent of the second UE based on data from one or more sensors associated with the second UE, where the intent-related information indicates exiting a parking spot, opening a door, providing OK to pass via blind spot detection, passing a VRU, passing a toll structure, entering an HOV lane, or making an eCall. Accordingly, a UE 104, and/or a component of a UE 104 such as the interactive communication component 140 (FIG. 23), the modem 814 (FIG. 23), the processor 812 (FIG. 23), the transceiver 802 (FIG. 23), etc., may provide means for receiving a message from a second UE including intent-related information related to an intent of the second UE based on data from one or more sensors associated with the second UE, where the intent-related information indicates exiting a parking spot, opening a door, providing OK to pass via blind spot detection, passing a VRU, passing a toll structure, entering an HOV lane, or making an eCall. In an aspect, for example, as described herein with reference to FIG. 1, the UE 149, and/or a component of the UE 149 such as the interactive communication component 140, the negotiation component 146, the modem 814 (FIG. 23), the processor 812 (FIG. 23), or the transceiver 802 (FIG. 23), may receive the intent-related information 145 from the UE 148, where the intent-related information 145 is derived based on the sensor data 142 from one or more sensors configured to detect an object, status, or event related to the UE 148 or related to a surrounding of the UE 148.

At block 2204 the method 2200 may further include communicating with the second UE regarding the intent-related information. For example, in an aspect, a UE 104 (which may be the UE 149 in FIG. 1), and/or a component of a UE 104 such as the interactive communication component 140 (FIG. 23), the modem 814 (FIG. 23), the processor 812 (FIG. 23), the transceiver 802 (FIG. 23), etc., may communicate with the second UE (which may be the UE 148 in FIG. 1) regarding the intent-related information. Accordingly, a UE 104, and/or a component of a UE 104 such as the interactive communication component 140, the modem 814 (FIG. 23), the processor 812 (FIG. 23), the transceiver 802 (FIG. 23), etc., may provide means for communicating with the second UE regarding the intent-related information. For example, in an aspect, as described herein with reference to FIG. 2, the vehicle B 204, and/or a component of the vehicle B 204 such as the interactive communication component 140 (FIG. 23), the modem 814 (FIG. 23), the processor 812 (FIG. 23), the transceiver 802 (FIG. 23), etc., may engage in a negotiation with vehicle A 202 regarding the intent of vehicle A 202 to exit a parking spot and the potential effect of the intent on the safety of vehicle B 204 and/or the VRUs 206.

Optionally, the receiving at block 2202 may include receiving a broadcast, unicast, or multicast V2X message from the second UE including the intent-related information. For example, in an aspect, a UE 104 (which may be the UE 149 in FIG. 1), and/or a component of a UE 104 such as the interactive communication component 140, the modem 814 (FIG. 23), the processor 812 (FIG. 23), the transceiver 802 (FIG. 23), etc., may receive a broadcast, unicast, or multicast V2X message from the second UE (which may be the UE 148 in FIG. 1) including the intent-related information. Accordingly, a UE 104, and/or a component of a UE 104 such as the interactive communication component 140, the modem 814 (FIG. 23), the processor 812 (FIG. 23), the transceiver 802 (FIG. 23), etc., may provide means for receiving a broadcast, unicast, or multicast V2X message from the second UE including the intent-related information. For example, in an aspect, as described herein with reference to FIG. 2, the vehicle B 204, and/or a component of the vehicle B 204 such as the interactive communication component 140 (FIG. 23), the modem 814 (FIG. 23), the processor 812 (FIG. 23), the transceiver 802 (FIG. 23), etc., may receive a broadcast or multicast message from the vehicle A 202, e.g., the V2X action 208 including an alert of parking exit. Subsequently, vehicle B 204 may engage in a negotiation with vehicle A 202 regarding the intent of vehicle A 202 to exit a parking spot and the potential effect of the intent on the safety of vehicle B 204 and/or the VRUs 206. In another aspect, for example, as described herein with reference to FIG. 4, the vehicle B 204, and/or a component of the vehicle B 204 such as the interactive communication component 140 (FIG. 23), the modem 814 (FIG. 23), the processor 812 (FIG. 23), the transceiver 802 (FIG. 23), etc., may receive a unicast message from the vehicle A 202, e.g., a V2X action 208 including intent-related information such as a door opening alert.

Optionally, the intent-related information indicates a physical maneuver of the second UE or an apparatus associated with the second UE.

Optionally, the method 2200 may further include determining that the physical maneuver affects at least one of the first UE or a third UE. For example, in an aspect, a UE 104 (which may be the UE 149 in FIG. 1), and/or a component of a UE 104 such as the interactive communication component 140, the modem 814 (FIG. 23), the processor 812 (FIG. 23), the transceiver 802 (FIG. 23), etc., may determine that the physical maneuver affects at least one of the first UE or a third UE. Accordingly, a UE 104, and/or a component of a UE 104 such as the interactive communication component 140, the modem 814 (FIG. 23), the processor 812 (FIG. 23), the transceiver 802 (FIG. 23), etc., may provide means for determining that the physical maneuver affects at least one of the first UE or a third UE. For example, in an aspect, as described herein with reference to FIG. 2, the vehicle B 204, and/or a component of the vehicle B 204 such as the interactive communication component 140 (FIG. 23), the modem 814 (FIG. 23), the processor 812 (FIG. 23), the transceiver 802 (FIG. 23), etc., may determine potential safety issues if vehicle A 202 proceeds to exit the parking spot. The potential safety issues may include, for example, insufficient time for vehicle B 204 to safely stop or change path.

Optionally, the communicating at block 2204 may include negotiating the physical maneuver with the second UE. For example, in an aspect, a UE 104 (which may be the UE 149 in FIG. 1), and/or a component of a UE 104 such as the interactive communication component 140, the modem 814 (FIG. 23), the processor 812 (FIG. 23), the transceiver 802 (FIG. 23), etc., may negotiate the physical maneuver with the second UE. Accordingly, a UE 104, and/or a component of a UE 104 such as the interactive communication component 140, the modem 814 (FIG. 23), the processor 812 (FIG. 23), the transceiver 802 (FIG. 23), etc., may provide means for negotiating the physical maneuver with the second UE. For example, in an aspect, as described herein with reference to FIG. 2, the vehicle B 204, and/or a component of the vehicle B 204 such as the interactive communication component 140 (FIG. 23), the modem 814 (FIG. 23), the processor 812 (FIG. 23), the transceiver 802 (FIG. 23), etc., may engage in a negotiation with vehicle A 202 regarding the intent of vehicle A 202 to exit a parking spot and the potential effect of the intent on the safety of vehicle B 204 and/or the VRUs 206.

Optionally, the second UE or the third UE include a VRU, and the physical maneuver endangers the VRU.

Optionally, the negotiating may include sending a request to the second UE to cease the physical maneuver; and receiving a confirmation message from the second UE confirming cessation of the physical maneuver. For example, in an aspect, a UE 104 (which may be the UE 149 in FIG. 1), and/or a component of a UE 104 such as the interactive communication component 140, the modem 814 (FIG. 23), the processor 812 (FIG. 23), the transceiver 802 (FIG. 23), etc., may send a request to the second UE to cease the physical maneuver; and receive a confirmation message from the second UE confirming cessation of the physical maneuver. Accordingly, a UE 104, and/or a component of a UE 104 such as the interactive communication component 140, the modem 814 (FIG. 23), the processor 812 (FIG. 23), the transceiver 802 (FIG. 23), etc., may provide means for sending a request to the second UE to cease the physical maneuver; and receiving a confirmation message from the second UE confirming cessation of the physical maneuver. For example, in an aspect, as described herein with reference to FIG. 3, the vehicle B 204, and/or a component of the vehicle B 204 such as the interactive communication component 140 (FIG. 23), the modem 814 (FIG. 23), the processor 812 (FIG. 23), the transceiver 802 (FIG. 23), etc., may send a message (e.g., via unicast) to vehicle A 202 directing vehicle A 202 to cease a maneuver when vehicle B 204 determines potential safety issues if vehicle A 202 proceeds with the maneuver, e.g., exits a parking spot. In response, vehicle A 202, and/or a component of vehicle A 202 such as the interactive communication component 140 (FIG. 23), the modem 814 (FIG. 23), the processor 812 (FIG. 23), the transceiver 802 (FIG. 23), etc., may send a message (e.g., via unicast) to vehicle B 204 acknowledging and confirming cessation of maneuver.

Optionally, the negotiating may include sending a request to the second UE to modify the physical maneuver; and receiving a confirmation message from the second UE confirming modification of the physical maneuver. For example, in an aspect, a UE 104 (which may be the UE 149 in FIG. 1), and/or a component of a UE 104 such as the interactive communication component 140, the modem 814 (FIG. 23), the processor 812 (FIG. 23), the transceiver 802 (FIG. 23), etc., may send a request to the second UE to modify the physical maneuver; and receive a confirmation message from the second UE confirming modification of the physical maneuver. Accordingly, a UE 104, and/or a component of a UE 104 such as the interactive communication component 140, the modem 814 (FIG. 23), the processor 812 (FIG. 23), the transceiver 802 (FIG. 23), etc., may provide means for sending a request to the second UE to modify the physical maneuver; and receiving a confirmation message from the second UE confirming modification of the physical maneuver. For example, in an aspect, as described herein with reference to FIGS. 10 and 11, the vehicle B 706, and/or a component of the vehicle B 706 such as the interactive communication component 140 (FIG. 23), the modem 814 (FIG. 23), the processor 812 (FIG. 23), the transceiver 802 (FIG. 23), etc., may perform intent-related V2X-based negotiation 712 with the vehicle A 704 to ensure a safe passing distance with the VRU 702. For example, after determining that the calculated intended passing distance to the VRU 702 is less than a threshold, vehicle A 704 may determine unsafe lateral passing distance to the VRU 702, and may negotiate with vehicle B 706 to enable safe passing by modifying a physical maneuver, e.g., Vehicle A 704 slowing down, and may send a confirmation message to vehicle B 706 to confirm the modification of the maneuver.

In any of the above aspects, a UE may receive data from multiple UEs or may communicate intent to multiple UEs. For example, in some aspects, data may be received from multiple UEs, intent-related information may be communicated to multiple UEs, and/or a maneuver may be negotiated with multiple UEs.

In any of the above aspects, at least some of the functionality of the first UE or the second UE may be performed by a network component, an RSU, etc. For example, network components may be used for intent derivation.

Figure 23:
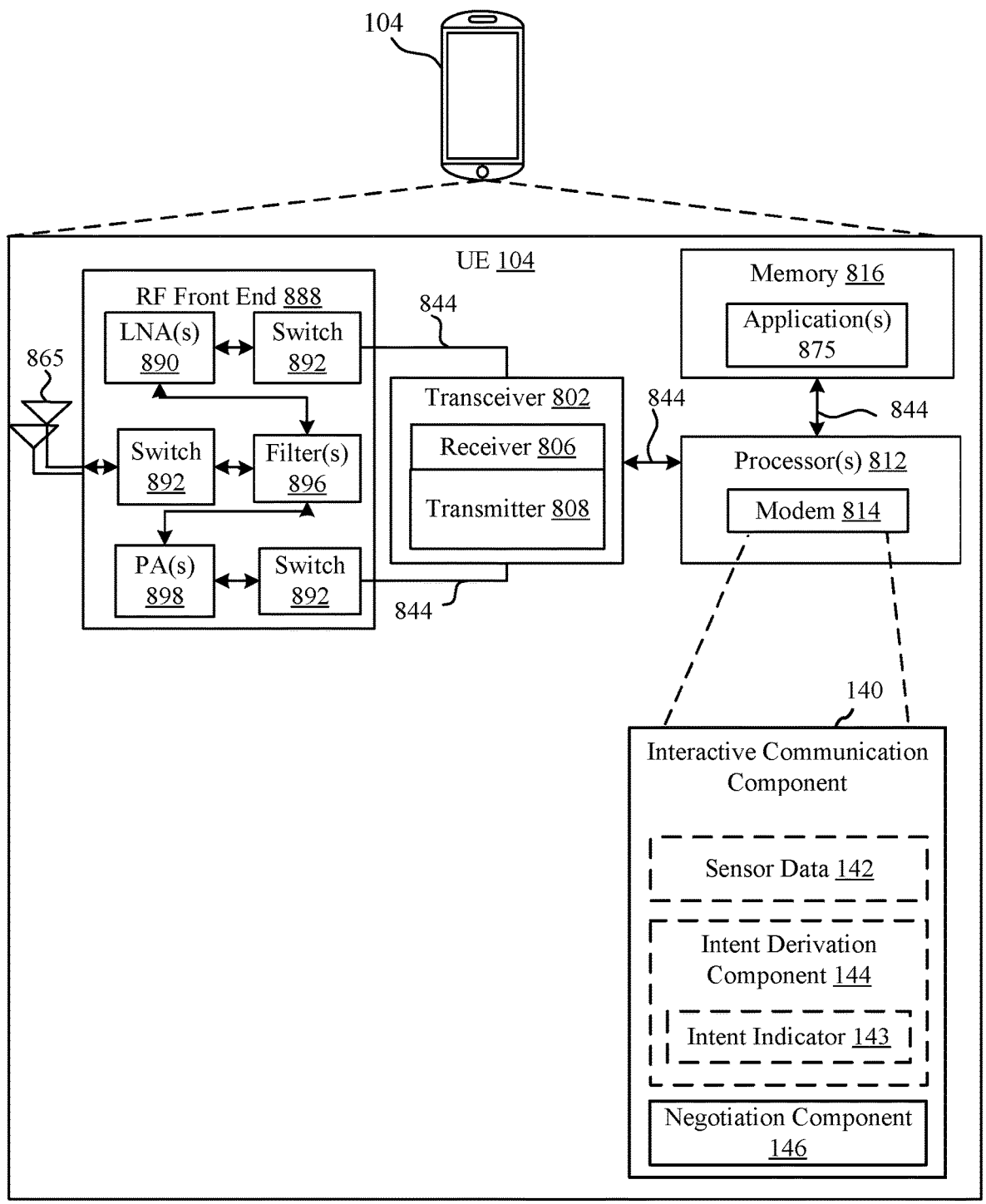
FIG. 23 is a schematic diagram of example components of the UEs of FIG. 1, according to some aspects.

Referring to FIG. 23, one example of an implementation of the UE 104, which may be the UE 148 or the UE 149, may include a variety of components, some of which have already been described above, but including components such as one or more processors 812 and memory 816 and transceiver 802 in communication via one or more buses 844, which may operate in conjunction with modem 814 and the interactive communication component 140 to enable one or more of the functions described herein related to the interactive communication in the D2D communications system 141 in FIG. 1. Further, the one or more processors 812, modem 814, memory 816, transceiver 802, RF front end 888, and one or more antennas 865, may be configured to support voice and/or data calls (simultaneously or non-simultaneously) in one or more radio access technologies. The antennas 865 may include one or more antennas, antenna elements, and/or antenna arrays.

In an aspect, the one or more processors 812 can include a modem 814 that uses one or more modem processors. The various functions related to the interactive communication component 140 may be included in modem 814 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with the interactive communication component 140 may be performed by transceiver 802.

Also, memory 816 may be configured to store data used herein and/or local versions of applications 875, the interactive communication component 140, and/or one or more of subcomponents thereof being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining the interactive communication component 140 and/or one or more of subcomponents thereof, and/or data associated therewith, when UE 104 is operating at least one processor 812 to execute the interactive communication component 140 and/or one or more subcomponents thereof.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102 or another UE 104. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may include, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and an associated specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 814 can configure transceiver 802 to operate at a specified frequency and power level based on the UE configuration of the UE 104 and the communication protocol used by modem 814.

In an aspect, modem 814 can be a multiband-multimode modem, which can process digital data and communicate with transceiver 802 such that the digital data is sent and received using transceiver 802. In an aspect, modem 814 can be multiband and be configured to support multiple frequency bands for a specific communications protocol. In an aspect, modem 814 can be multimode and be configured to support multiple operating networks and communications protocols. In an aspect, modem 814 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Figure 24:
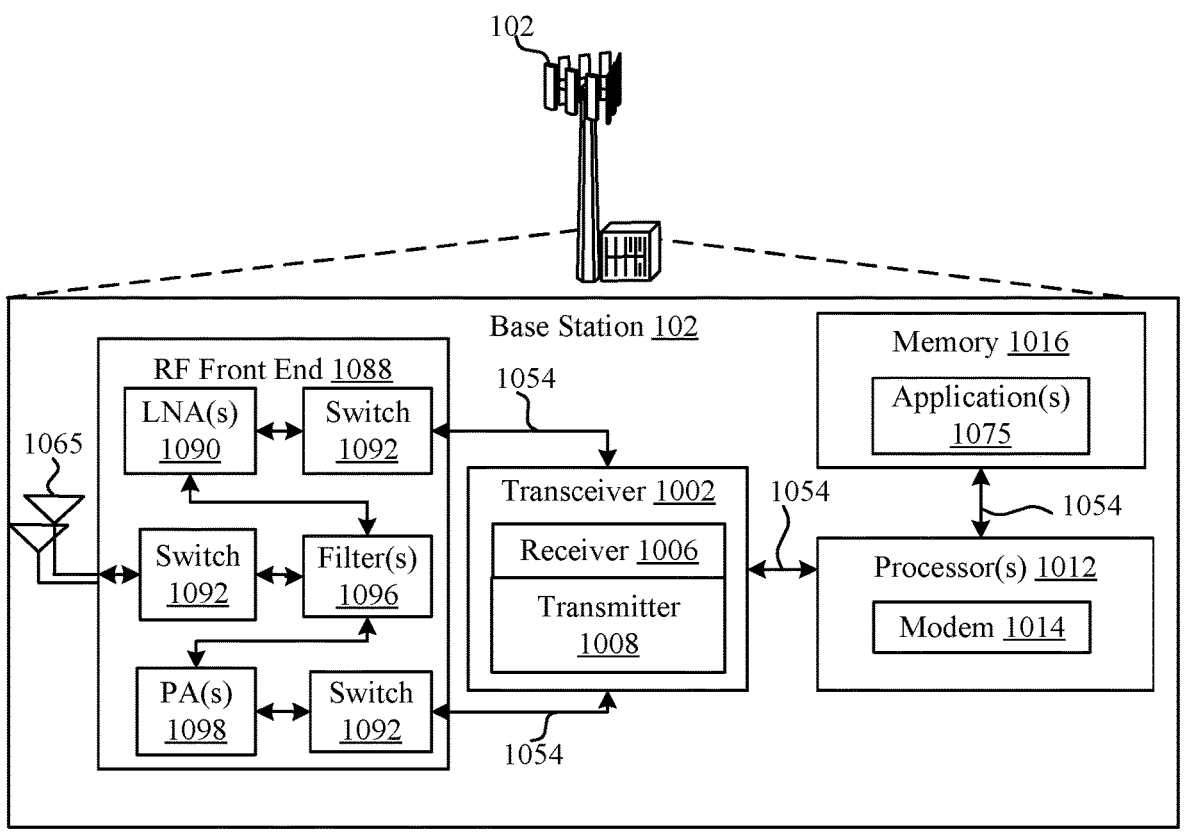
FIG. 24 is a schematic diagram of example components of the base station of FIG. 1, according to some aspects.

Referring to FIG. 24, one example of an implementation of a base station, which may be a base station 102 in FIG. 1, may include a variety of components, some of which have already been described above, but including components such as one or more processors 1012 and memory 1016 and transceiver 1002 in communication via one or more buses 1054, which may operate in conjunction with modem 1014 to enable one or more of the functions described herein related to wireless communications. Further, the one or more processors 1012, modem 1014, memory 1016, transceiver 1002, RF front end 1088, and one or more antennas 1065, may be configured to support voice and/or data calls (simultaneously or non-simultaneously) in one or more radio access technologies. The antennas 1065 may include one or more antennas, antenna elements, and/or antenna arrays.

The transceiver 1002, receiver 1006, transmitter 1008, one or more processors 1012, memory 1016, applications 1075, buses 1054, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

Figure 25:
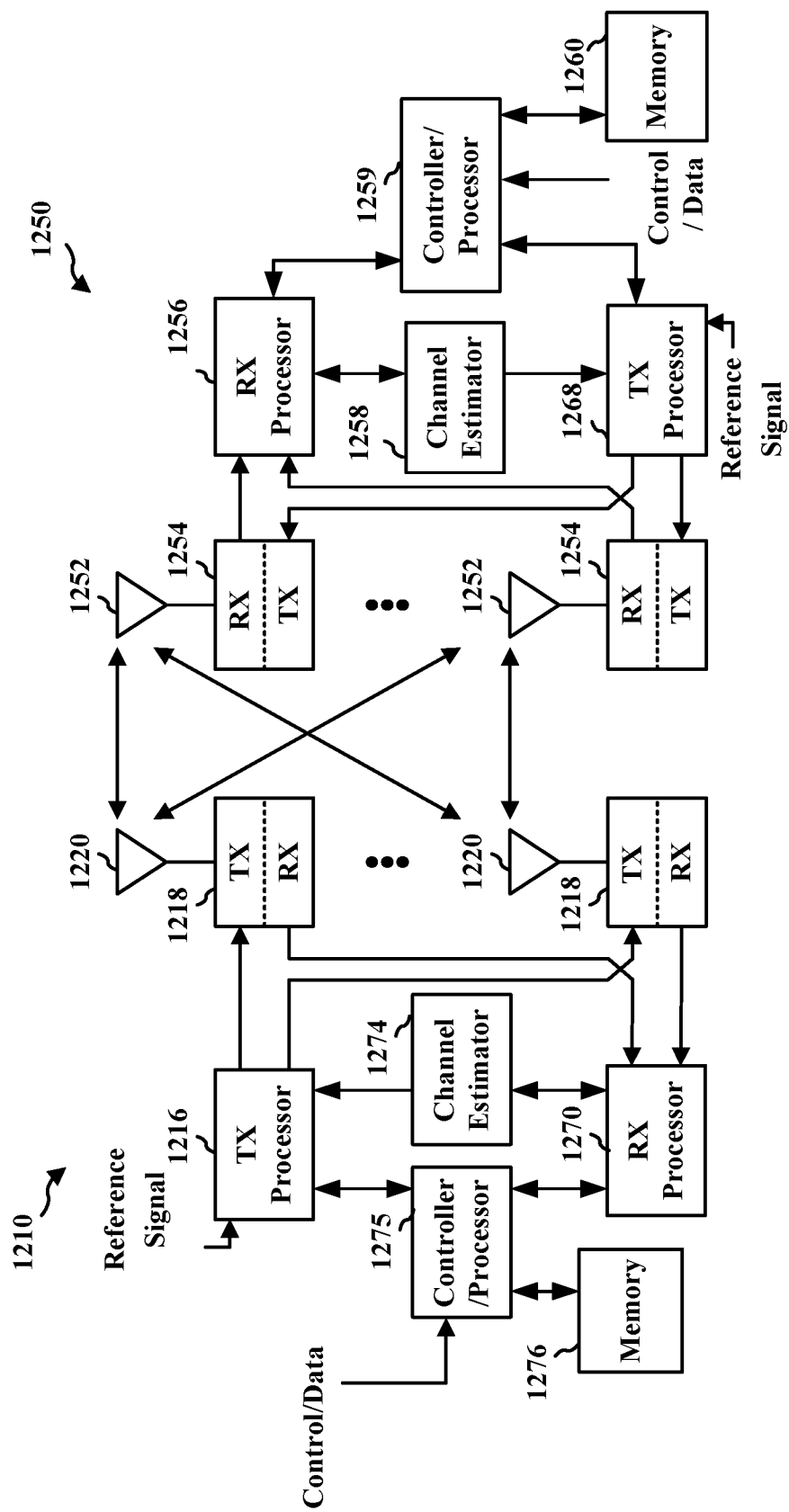
FIG. 25 is a diagram illustrating an example of a base station and a UE in an access network.

FIG. 25 is a block diagram of a base station 1210 in communication with a UE 1250 in an access network, where the base station 1210 may be the same as or may include at least a portion of a base station 102 in FIG. 1, and the UE 1250 may be the same as or may include at least a portion of a UE 104 in FIG. 1. In the DL, IP packets from the EPC 160 may be provided to a controller/processor 1275. The controller/processor 1275 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 575 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 1216 and the receive (RX) processor 1270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 1216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1274 may be used to determine the coding and modulation scheme, as well as for spatial processing. The channel estimate may be derived from a reference signal and/or channel condition feedback transmitted by the UE 1250. Each spatial stream may then be provided to a different antenna 1220 via a separate transmitter 1218TX. Each transmitter 1218TX may modulate an RF carrier with a respective spatial stream for transmission.

At the UE 1250, each receiver 1254RX receives a signal through its respective antenna 1252. Each receiver 1254RX recovers information modulated onto an RF carrier and provides the information to the receive (RX) processor 1256. The TX processor 1268 and the RX processor 1256 implement layer 1 functionality associated with various signal processing functions. The RX processor 1256 may perform spatial processing on the information to recover any spatial streams destined for the UE 1250. If multiple spatial streams are destined for the UE 1250, they may be combined by the RX processor 1256 into a single OFDM symbol stream. The RX processor 1256 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 1210. These soft decisions may be based on channel estimates computed by the channel estimator 1258. The soft decisions are then decoded and deinterleaved to recover the data and control signals that were originally transmitted by the base station 1210 on the physical channel. The data and control signals are then provided to the controller/processor 1259, which implements layer 3 and layer 2 functionality.

The controller/processor 1259 can be associated with a memory 1260 that stores program codes and data. The memory 1260 may be referred to as a computer-readable medium. In the UL, the controller/processor 1259 provides demultiplexing between transport and logical channels, packet reassembly, deciphering, header decompression, and control signal processing to recover IP packets from the EPC 160. The controller/processor 1259 is also responsible for error detection using an ACK and/or NACK protocol to support HARQ operations.

Similar to the functionality described in connection with the DL transmission by the base station 1210, the controller/processor 1259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 1258 from a reference signal or feedback transmitted by the base station 1210 may be used by the TX processor 1268 to select the appropriate coding and modulation schemes, and to facilitate spatial processing. The spatial streams generated by the TX processor 1268 may be provided to different antenna 1252 via separate transmitters 1254TX. Each transmitter 1254TX may modulate an RF carrier with a respective spatial stream for transmission.

The UL transmission is processed at the base station 1210 in a manner similar to that described in connection with the receiver function at the UE 1250. Each receiver 1218RX receives a signal through its respective antenna 1220. Each receiver 1218RX recovers information modulated onto an RF carrier and provides the information to a RX processor 1270.

The controller/processor 1275 can be associated with a memory 1276 that stores program codes and data. The memory 1276 may be referred to as a computer-readable medium. In the UL, the controller/processor 1275 provides demultiplexing between transport and logical channels, packet reassembly, deciphering, header decompression, control signal processing to recover IP packets from the UE 1250. IP packets from the controller/processor 1275 may be provided to the EPC 160. The controller/processor 1275 is also responsible for error detection using an ACK and/or NACK protocol to support HARQ operations.

At least one of the TX processor 1268, the RX processor 1256, and the controller/processor 1259 may be configured to perform aspects in connection with the interactive communication component 140 of a UE 104 (e.g., UE 148 or UE 149) in FIG. 1.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first vehicular user equipment (UE), comprising:
   receiving data from a proximity sensor configured to detect a seatbelt status or a seat occupancy status of the first vehicular UE or from a sensor detecting a driver's hands on a steering wheel of the first vehicular UE;
   predicting an impending physical maneuver of the first vehicular UE, based on applying learned behavior analysis to the data, wherein the impending physical maneuver includes the first vehicular UE exiting a parking spot or opening a door; and
   communicating, by an application layer of a protocol layer stack of the first vehicular UE, a unicast vehicle-to-everything (V2X) message to a second vehicular UE, wherein the unicast V2X message includes an intent indicator indicating the impending physical maneuver of the first vehicular UE to exit the parking spot or open the door.

2. The method of claim 1, further comprising:
   receiving an unsolicited indicator from the second vehicular UE, wherein the unsolicited indicator is configured to help or trigger the predicting of the impending physical maneuver.

3. The method of claim 1, wherein the identifying predicting includes:
   transmitting the data to another device; and
   receiving information related to the impending physical maneuver from the another device in response to the data.

4. The method of claim 3, wherein the another device comprises an infrastructure device, a road side unit (RSU), or a Mobile Edge Computing (MEC) platform.

5. The method of claim 1, wherein the receiving further comprises receiving further data from an in-cabin camera, radar, or light detection and ranging (LIDAR) configured to monitor a status of an occupant inside the first vehicular UE.

6. The method of claim 1, wherein the receiving further comprises receiving further data from a voice detection sensor configured to monitor a status of an occupant inside the first vehicular UE.

7. The method of claim 1, wherein the predicting comprises at least one of:
   performing sensor fusion on the data; or
   applying machine learning to the data.

8. The method of claim 1, wherein the communicating comprises:
   communicating the unicast V2X message over a device-2-device (D2D) communication link between the first vehicular UE and the second vehicular UE.

9. The method of claim 1, wherein the communicating comprises:
   communication communicating via a network, an infrastructure, a road side unit (RSU), a relay, or a wide area network (WAN) connection comprising Uu connectivity.

10. The method of claim 1, further comprising:
    negotiating, by the first vehicular UE, using V2X unicast communication, the impending physical maneuver with the second vehicular UE.

11. The method of claim 10, wherein the negotiating comprises:
    receiving a request from the second vehicular UE to cease the impending physical maneuver; and
    sending a confirmation message to the second vehicular UE to confirm cessation of the impending physical maneuver.

12. The method of claim 10, wherein the negotiating comprises:
    receiving a request from the second vehicular UE to modify the impending physical maneuver; and
    sending a confirmation message to the second vehicular UE to confirm modification of the impending physical maneuver.

13. A method of wireless communication at a first vehicular user equipment (UE), comprising:
    receiving, by an application layer of a protocol layer stack of the first vehicular UE, a unicast vehicle-to-everything (V2X) message from a second vehicular UE including an intent indicator indicating an impending physical maneuver of the second vehicular UE to exit a parking spot or open a door, based on data from a proximity sensor configured to detect a seatbelt status or a seat occupancy status of the second vehicular UE or from a sensor detecting a driver's hands on a steering wheel of the second vehicular UE; and
    communicating, by the first vehicular UE, with the second vehicular UE regarding the impending physical maneuver of the second vehicular UE to exit the parking spot or open the door.

14. The method of claim 13, wherein the receiving comprises:
    receiving the unicast V2X message over a device-2-device (D2D) communication link between the first vehicular UE and the second vehicular UE.

15. The method of claim 13, wherein the communicating comprises:
    negotiating, by the first vehicular UE, using V2X unicast communication, the impending physical maneuver with the second vehicular UE.

16. The method of claim 15, further comprising:
    determining that the impending physical maneuver affects at least one of the first vehicular UE or a third vehicular UE.

17. The method of claim 16, wherein the second vehicular UE or the third vehicular UE comprise a vulnerable road user (VRU), wherein the impending physical maneuver endangers the VRU.

18. The method of claim 16, wherein the negotiating comprises:
    sending a request to the second vehicular UE to cease the impending physical maneuver; and
    receiving a confirmation message from the second vehicular UE confirming cessation of the impending physical maneuver.

19. The method of claim 16, wherein the negotiating comprises:
    sending a request to the second vehicular UE to modify the impending physical maneuver; and
    receiving a confirmation message from the second vehicular UE confirming modification of the impending physical maneuver.

20. A non-transitory computer-readable medium of a first vehicular user equipment (UE), the non-transitory computer-readable medium storing instructions that when executed by a processor of the first vehicular UE cause the processor to:
    receive data from a proximity sensor configured to detect a seatbelt status or a seat occupancy status of the first vehicular UE or from a sensor detecting a driver's hands on a steering wheel of the first vehicular UE;
    predict an impending physical maneuver of the first vehicular UE, based on applying learned behavior analysis to the data, wherein the impending physical maneuver includes the first vehicular UE exiting a parking spot or opening a door; and communicate, by an application layer of a protocol layer stack of the first vehicular UE, a unicast vehicle-to-everything (V2X) message to a second vehicular UE, wherein the unicast V2X message includes an intent indicator indicating the impending physical maneuver of the first vehicular UE to exit the parking spot or open the door.

21. A first vehicular user equipment (UE) for wireless communication, comprising:

a memory storing instructions; and a processor in communication with the memory, wherein the processor is configured to execute the instructions to:

receive data from a proximity sensor configured to detect a seatbelt status or a seat occupancy status of the first vehicular UE or from a sensor detecting a driver's hands on a steering wheel of the first vehicular UE;

predict an impending physical maneuver of the first vehicular UE, based on applying learned behavior analysis to the data, wherein the impending physical maneuver includes the first vehicular UE exiting a parking spot or opening a door; and communicate, by an application layer of a protocol layer stack of the first vehicular UE, a unicast vehicle-to-everything (V2X) message to a second vehicular UE, wherein the unicast V2X message includes an intent indicator indicating the impending physical maneuver of the first vehicular UE to exit the parking spot or open the door.

* * * * *